United States Patent
Ejiri

(10) Patent No.: US 12,231,537 B2
(45) Date of Patent: Feb. 18, 2025

(54) MEMORY SYSTEM ENCRYPTING DATA

(71) Applicant: Kioxia Corporation, Tokyo (JP)

(72) Inventor: Taichi Ejiri, Yokohama Kanagawa (JP)

(73) Assignee: KIOXIA CORPORATION

( * ) Notice: Subject to any disclaimer, the term of this patent is extended or adjusted under 35 U.S.C. 154(b) by 627 days.

(21) Appl. No.: 17/190,027

(22) Filed: Mar. 2, 2021

(65) Prior Publication Data

US 2022/0045850 A1 Feb. 10, 2022

(30) Foreign Application Priority Data

Aug. 7, 2020 (JP) .................. 2020-134803

(51) Int. Cl.
*H04L 9/08* (2006.01)
*G06F 13/16* (2006.01)
*H04L 9/06* (2006.01)
*H04L 9/14* (2006.01)

(52) U.S. Cl.
CPC ........ *H04L 9/0822* (2013.01); *G06F 13/1668* (2013.01); *H04L 9/0643* (2013.01); *H04L 9/0825* (2013.01); *H04L 9/14* (2013.01)

(58) Field of Classification Search
CPC ... H04L 9/0822; H04L 9/0643; H04L 9/0825; H04L 9/14; H04L 9/0894; G06F 13/1668; G06F 12/1408; G06F 12/0246; G06F 12/1009
See application file for complete search history.

(56) References Cited

U.S. PATENT DOCUMENTS

| | | | |
|---|---|---|---|
| 9,031,233 B2* | 5/2015 | Kang | H04L 9/0894 713/176 |
| 10,326,744 B1* | 6/2019 | Nossik | H04L 63/0435 |
| 10,841,080 B2* | 11/2020 | Resch | H04L 9/0662 |
| 10,887,088 B2* | 1/2021 | Resch | H04L 9/0869 |
| 11,431,488 B1* | 8/2022 | Sapuntzakis | H04L 9/085 |
| 11,909,868 B2* | 2/2024 | Wall | H04L 9/0825 |
| 2013/0121488 A1* | 5/2013 | Kang | G06F 21/78 380/44 |
| 2014/0037093 A1* | 2/2014 | Park | H04L 9/0894 380/277 |
| 2016/0004716 A1 | 1/2016 | Akirav | |
| 2017/0346625 A1* | 11/2017 | Yan | G06F 21/602 |
| 2018/0364917 A1* | 12/2018 | Ki | G06F 12/1018 |
| 2019/0073152 A1* | 3/2019 | Nagle | G06F 3/067 |
| 2019/0215155 A1* | 7/2019 | Wang | H04L 9/0861 |
| 2020/0034560 A1 | 1/2020 | Natanzon | |
| 2020/0177382 A1* | 6/2020 | Perlman | H04L 9/14 |
| 2022/0261162 A1* | 8/2022 | Hikichi | H04L 9/3236 |

* cited by examiner

*Primary Examiner* — Oleg Korsak
(74) *Attorney, Agent, or Firm* — Foley & Lardner LLP

(57) ABSTRACT

A memory system includes a nonvolatile memory and a controller. In a case where first encrypted data obtained by encrypting first data with a first DEK is stored in the nonvolatile memory, in response to determining that second data received based on a first write request from a host is the same as the first data and a first user uses the host, the controller encrypts the first DEK with a first KEK associated with the first user to acquire a first encrypted DEK, and stores the first encrypted DEK.

8 Claims, 14 Drawing Sheets

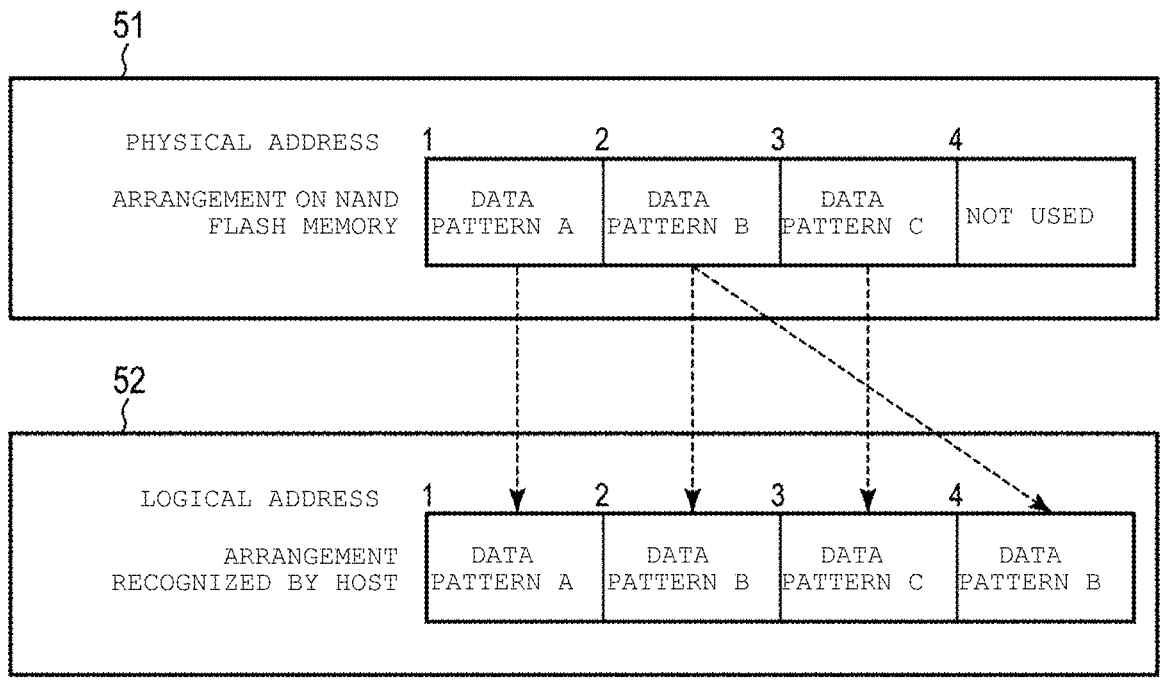

FIG. 5

| LOGICAL ADDRESS | ENCRYPTED DEK |
|---|---|
| 1 | AAA |
| 2 | BBB |
| 3 | CCC |
| 4 | DDD |
| ⋮ | ⋮ |

MEMORY SYSTEM ENCRYPTING DATA

CROSS-REFERENCE TO RELATED APPLICATION

This application is based upon and claims the benefit of priority from Japanese Patent Application No. 2020-134803, filed Aug. 7, 2020, the entire contents of which are incorporated herein by reference.

FIELD

Embodiments described herein relate generally to a technique for controlling a memory system having a nonvolatile memory.

BACKGROUND

In recent years, memory systems generally include a nonvolatile memory, for example, a solid state drive (SSD) including a NAND flash memory. The SSD is commonly used as a main storage for various computing devices.

Data stored in a storage may be encrypted. For example, data is encrypted with an encryption key unique to each user, and thus it is possible to achieve confidentiality that the data of a certain user cannot be acquired by another user. In addition, it is required to efficiently store a large amount of data in a storage. Deduplication may be used to improve storage efficiency.

However, since data encrypted with a key for each user cannot be shared by a plurality of users, it is difficult to achieve deduplication of the data across the plurality of users. Therefore, it is necessary to implement a new function that can improve storage efficiency while maintaining the confidentiality of data for each user.

DESCRIPTION OF THE DRAWINGS

FIG. 2 is a diagram illustrating an example of data deduplication in the memory system of the first embodiment.

FIG. 3 is a diagram illustrating a configuration example of a logical-to-physical address conversion table used in the memory system of the first embodiment.

FIG. 4 is a diagram illustrating a configuration example of a physical address versus hash value table used in the memory system of the first embodiment.

FIG. 5 is a diagram illustrating a configuration example of an encrypted data encryption key (DEK) table used in the memory system of the first embodiment.

DETAILED DESCRIPTION

Embodiments provide a memory system that can improve storage efficiency while maintaining the confidentiality of data for each user.

In general, according to one embodiment, a memory system includes a first nonvolatile memory, and a controller operatively coupled to the first nonvolatile memory. The controller is configured to, in response to determining that second data received based on a first write request from a host is the same as first data and a first user uses the host, the first data being encrypted using a first data encryption key (DEK) as first encrypted data and stored in the first nonvolatile memory, encrypt the first DEK using a first key encryption key (KEK) associated with the first user to acquire a first encrypted DEK, and store the first encrypted DEK. The controller is configured to, in response to determining that the second data is the same as the first data and a second user different from the first user uses the host, encrypt the first DEK using a second KEK associated with the second user to acquire a second encrypted DEK, and store the second encrypted DEK. The controller is configured to, in response to determining that the second data is different from the first data and the first user uses the host, use the second data to generate a second DEK, encrypt the second data using the second DEK to acquire second encrypted data, write the second encrypted data into the first nonvolatile memory, encrypt the second DEK using the first KEK to acquire a third encrypted DEK, and store the third encrypted DEK. The controller is configured to, in response to determining that the second data is different from the first data and the second user uses the host, use the second data to generate the second DEK, encrypt the second data with the second DEK to acquire the second encrypted data, write the second encrypted data into the first nonvolatile memory, encrypt the second DEK using the second KEK to acquire a fourth encrypted DEK, and store the fourth encrypted DEK.

Hereinafter, embodiments will be described with reference to the drawings.

First Embodiment

Figure 1:
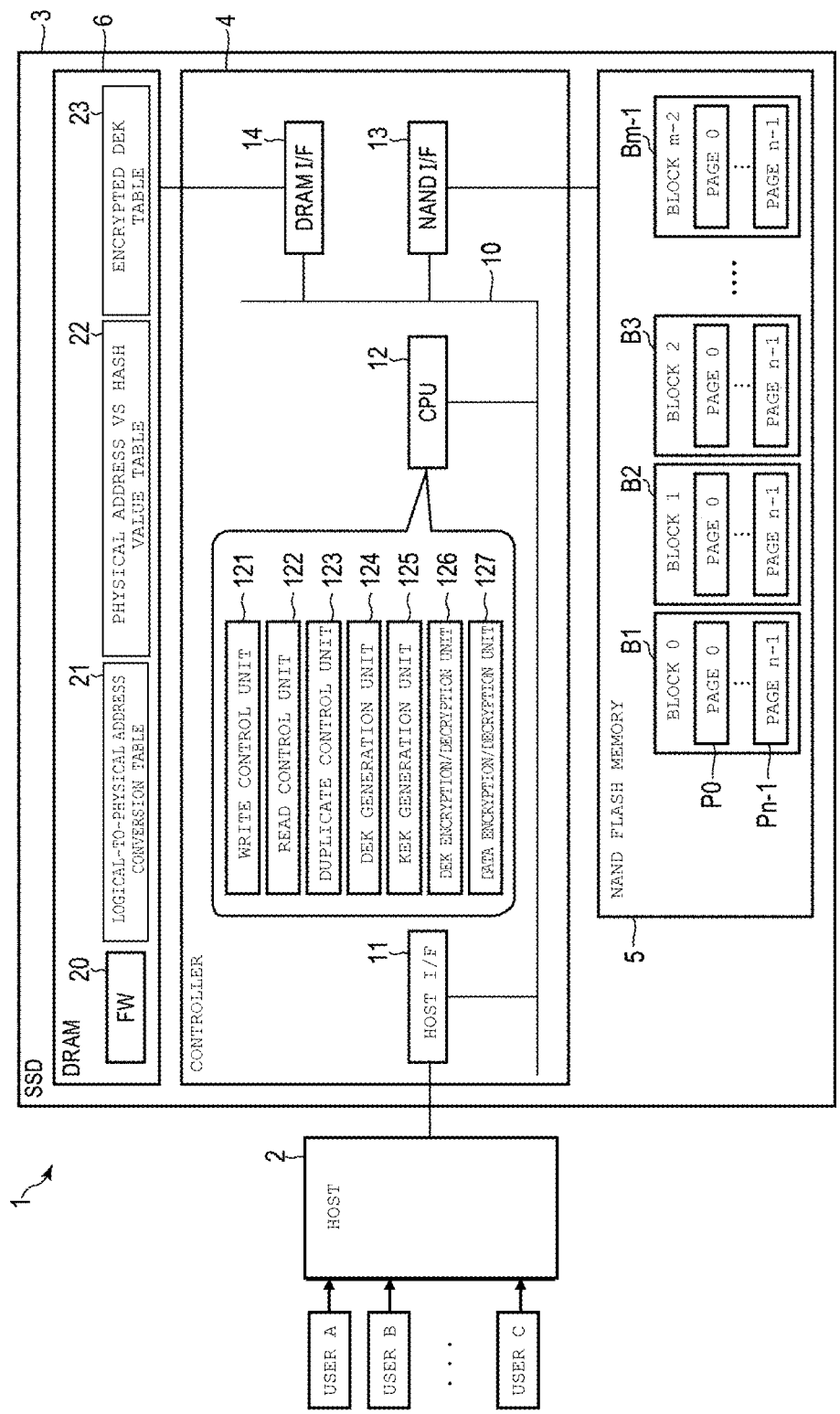
FIG. 1 is a block diagram illustrating a configuration example of an information processing system that includes a memory system according to a first embodiment.

First, a configuration of an information processing system 1 that includes a memory system according to a first embodiment will be described with reference to FIG. 1. The information processing system 1 includes a host device 2 (hereinafter, referred to as a host 2) and the memory system.

The memory system is a semiconductor storage device configured to write data into a nonvolatile memory such as a NAND flash memory 5 and read the data from the nonvolatile memory, and is also called a storage device. The nonvolatile memory includes a plurality of memory elements. Data can be written to each of the plurality of memory elements multiple times. The memory system is implemented as, for example, a solid state drive (SSD) 3 that includes the NAND flash memory 5. Although a case where the memory system is implemented as the SSD 3 will be exemplified, the memory system may be implemented as a hard disk drive (HDD). Alternatively, the memory system may be implemented as a storage system (e.g., enterprise storage) that includes a plurality of storage devices.

The host 2 may be a storage server that stores a large amount of various data in the SSD 3, or may be a personal computer. The host 2 may be used by a plurality of users (for example, a user A, a user B, and a user C). The number of hosts 2 may be plural, and each host may be used by one or more users.

The SSD 3 may be used as a storage for the host 2. The SSD 3 may be built in the host 2 or may be connected to the host 2 via a cable or a network.

An interface for connecting the host 2 to the SSD 3 is based on Small Computer System Interface (SCSI), Serial Attached SCSI (SAS), AT Attachment (ATA), Serial ATA (SATA), PCI Express (PCIe) (registered trademark), Ethernet (registered trademark), Fibre channel, NVM Express (NVMe) (registered trademark), and the like.

The SSD 3 includes a controller 4 and the NAND flash memory 5. The controller 4 may be implemented by a circuit such as a system-on-a-chip (SoC).

The SSD 3 includes a random access memory (RAM), which is a volatile memory, for example, a dynamic random access memory (DRAM) 6. Alternatively, a static random access memory (SRAM) may be built in the controller 4. The DRAM 6 may also be built in the controller 4.

The DRAM 6 is provided with a storage area for firmware (FW) 20 loaded from, for example, the NAND flash memory 5.

The NAND flash memory 5 includes a plurality of blocks. Each block includes a plurality of pages. One block functions as a unit of a data erase operation. The block may be referred to as an "erasing block" or a "physical block". Each page includes a plurality of memory cells connected to the same word line. A single page is a unit of a data write operation and a data read operation. The word line may be used as the unit of the data write operation and the data read operation. The data write operation may also be referred to as a data program operation.

There is an upper limit for the number of program/erase cycles (maximum number of P/E cycles) that is allowable for each block. One P/E cycle of a certain block includes a data erase operation of bringing all memory cells in this block into an erased state, and a data write operation of writing data into each page of this block.

The controller 4 includes a host interface (host I/F) 11, a CPU 12, a NAND I/F 13, a DRAM interface (DRAM I/F) 14, and the like. The host I/F 11, the CPU 12, the NAND I/F 13, and the DRAM I/F 14 are connected to each other via a bus 10.

The controller 4 is electrically connected to the NAND flash memory 5 via the NAND I/F 13 corresponding to an interface standard such as Toggle DDR or Open NAND Flash Interface (ONFI). The NAND I/F 13 functions as a NAND control circuit configured to control the NAND flash memory 5.

The NAND I/F 13 may be connected to a plurality of NAND flash memory chips in the NAND flash memory 5 via a plurality of channels, respectively. The plurality of NAND flash memory chips can be driven in parallel, and thus a bandwidth of access to the NAND flash memory 5 can be widened.

The controller 4 functions as a memory controller configured to control the NAND flash memory 5.

The controller 4 may function as a flash translation layer (FTL) configured to perform data management and block management on the NAND flash memory 5. The data management executed by the FTL includes (1) management of mapping information indicating a correspondence relationship between each logical address and each physical address of the NAND flash memory 5, (2) a process for concealing a data read/write operation in the page unit and a data erase operation in the block unit, and the like. The logical address is an address used by the host 2 to designate an address of the SSD 3.

The management of mapping between each logical address and each physical address is executed by using a logical-to-physical address conversion table 21. The controller 4 manages the mapping in a specific management size unit by using the logical-to-physical address conversion table 21. A physical address corresponding to a certain logical address indicates a physical storage location in the NAND flash memory 5 in which data of this logical address is written. The logical-to-physical address conversion table 21 may be loaded from the NAND flash memory 5 into the DRAM 6 when the power of the SSD 3 is turned on.

Writing of data into one page is possible only once per P/E cycle. Thus, the controller 4 writes update data corresponding to a certain logical address into another physical storage location instead of a physical storage location in which the previous data corresponding to the logical address is stored. The controller 4 invalidates the previous data by updating the logical-to-physical address conversion table 21 to associate the logical address with the new physical storage location. Hereinafter, data referred to from the logical-to-physical address conversion table 21 (that is, data linked to the logical address) will be referred to as valid data. In addition, data that is not linked to any logical address will be referred to as invalid data. The valid data is data that may be read from the host 2 in the future. The invalid data is data that is no longer read from the host 2.

The above-mentioned physical address and logical address are concepts for controlling the NAND flash memory 5 or a hard disk. The physical address generally specifies a storage area in units of 512 bytes to 4096 bytes. The logical address is defined by various international standards. The physical address and the logical address are physical/logical addresses of the NAND technology, and are referred to as lower layer physical/logical addresses here. The controller 4 uses the lower layer physical/logical addresses in a layer close to controlling of the NAND flash memory 5, for example.

The controller 4 may further manage a physical address and a logical address for specifying a larger storage area in a layer close to the host 2. Hereinafter this physical address and this logical address are referred to as upper layer physical/logical addresses. The physical address and the logical address specify, for example, storage areas in the unit of several kilobytes (KB) to megabytes (MB). In the present embodiment, for example, the upper layer physical/logical addresses are used in deduplication and encryption of data, which will be described later.

That is, the controller 4 may be configured to use the lower layer physical/logical addresses in a layer close to the NAND flash memory 5 and use the upper layer physical/logical addresses in a layer closer to the host 2 than the NAND flash memory 5.

The block management includes defective block management, wear leveling, garbage collection (compaction), and the like.

The host I/F 11 is an interface circuit that performs communication between the SSD 3 and the host 2 which is an external device of the SSD 3. The host I/F 11 functions as a circuit for receiving various commands, for example, I/O commands and various control commands from the host 2. The I/O commands may include a write command and a read command. The control commands may include an unmap command (trim command) and a format command. The format command is a command for unmapping the entire logical addresses of the SSD 3. The host I/F 11 also functions as a transmission circuit that transmits to the host 2 a response or data in accordance with a command.

The DRAM I/F 14 functions as a DRAM control circuit configured to control access to the DRAM 6. A storage area of the DRAM 6 is allocated to, for example, an area for storing the FW 20, a buffer area used as a read/write buffer, and a cache area for information such as the logical-to-physical address conversion table 21, a physical address versus hash value table 22, and an encrypted data encryption key (DEK) table 23.

The physical address versus hash value table 22 and the encrypted DEK table 23 may be loaded from the NAND flash memory 5 into the DRAM 6 when the power of the SSD 3 is turned on. The physical address versus hash value table 22 and the encrypted DEK table 23 may be stored in the NAND flash memory 5 when the power of the SSD 3 is turned off. The physical address versus hash value table 22 represents a correspondence between a hash value of user data and a physical address indicating a physical storage location of the user data that is encrypted and stored in the NAND flash memory 5. The encrypted DEK table 23 is a table for encrypting and storing a data encryption key for encrypting user data. Details of the physical address versus hash value table 22 and the encrypted DEK table 23 will be described later with reference to FIGS. 4 and 5, respectively.

The controller 4 has functions for deduplication and encryption of data.

FIG. 2 illustrates an example of deduplication of data in the SSD 3. The deduplication is a control method for preventing duplicated writing of data having the same data pattern into the NAND flash memory 5. The controller 4 analyzes user data to be written into the NAND flash memory 5 and automatically excludes detected-duplicated data. That is, when user data to be written is duplicated data, the controller 4 skips writing of the user data into the NAND flash memory 5.

For example, in a periodic backup process, writing of user data which is the same as user data previously written in the NAND flash memory 5 may be frequently performed. If deduplication is used in such a case, an amount of data transfer between the controller 4 and the NAND flash memory 5 and a data storage capacity of the NAND flash memory 5 can be significantly saved. Reducing the number of times of writing data can extend the lifetime of a memory device such as the NAND flash memory 5, which has an upper limit of the number of P/E cycles.

FIG. 2 illustrates an example of data deduplication in a data arrangement 51 based on a physical address and a data arrangement 52 based on a logical address. The data arrangement 51 based on the physical address indicates physical storage locations of data (data patterns) on the NAND flash memory 5. The data arrangement 52 based on the logical address indicates logical storage locations of the data recognized by the host 2.

Specifically, in the data arrangement 51 based on the physical address, a data pattern A is stored in physical address "1". A data pattern B is stored in physical address "2". A data pattern C is stored in physical address "3". Physical address "4" is in an unused state.

In the data arrangement 52 based on the logical address, the data pattern A is stored in logical address "1". The data pattern B is stored in logical address "2". The data pattern C is stored in logical address "3". The data pattern B is stored in logical address "4".

Therefore, the data pattern B is physically stored in only one place (that is, in physical address "2"), but is recognized as being stored in two places (that is, in logical addresses "2" and "4") by the host 2.

The controller 4 may manage this kind of relationship between the logical address and the physical address by using the logical-to-physical address conversion table 21.

FIG. 3 illustrates a configuration example of the logical-to-physical address conversion table 21. The logical-to-physical address conversion table 21 indicates mapping between the logical address and the physical address of the NAND flash memory 5. The logical-to-physical address conversion table 21 is, for example, a look-up table (LUT).

The mapping between the logical address and the physical address indicated in the logical-to-physical address conversion table 21 corresponds to a set of data such as a block. That is, the controller 4 may manage the mapping between the logical address and the physical address in the block unit by using the logical-to-physical address conversion table 21. A size of the block is, for example, several KB to several MB.

The logical-to-physical address conversion table 21 illustrated in FIG. 3 corresponds to the data arrangement 51 based on the physical address and the data arrangement 52 based on the logical address illustrated in FIG. 2. More specifically, the logical-to-physical address conversion table 21 indicates (1) mapping between logical address "1" and physical address "1", (2) mapping between logical address "2" and physical address "2", (3) mapping between logical address "3" and physical address "3", and (4) mapping between logical address "4" and physical address "2".

Consequently, since the plurality of logical addresses "2" and "4" are associated with the single physical address "2" (that is, corresponding to the data pattern B), it is not necessary to physically store the data pattern B in two physical locations. That is, it is possible to avoid storing the same data pattern in the NAND flash memory 5 in duplicate.

Refer to FIG. 1 again. The CPU 12 is a processor configured to control the host I/F 11, the NAND I/F 13, and the DRAM I/F 14. The CPU 12 performs various processes by executing the FW 20 loaded in the DRAM 6. That is, the FW 20 is a control program for controlling an operation of the CPU 12. In addition to the above-described FTL processing, the CPU 12 may execute command processing and the like for processing various commands from the host 2. Part or the whole of the FTL processing and the command processing may be executed by dedicated hardware in the controller 4.

In order to perform deduplication and encryption of data, the CPU 12 may function as, for example, a write control unit 121, a read control unit 122, a duplicate control unit 123, a DEK generation unit 124, a key encryption key (KEK) generation unit 125, a DEK encryption/decryption unit 126, and a data encryption/decryption unit 127. The CPU 12 functions as each of these units by executing, for example, the FW 20. Some functions of each of the units may be implemented by dedicated hardware (circuit). Alternatively, some of the functions of each unit may be implemented by dedicated hardware, and other functions may be implemented by the CPU 12 that executes the FW 20.

The write control unit 121 receives a write command from the host 2 via the host I/F 11. The write control unit 121 may control the duplicate control unit 123, the DEK generation unit 124, the KEK generation unit 125, the DEK encryption/decryption unit 126, and the data encryption/decryption unit 127 to perform a write operation in accordance with the write command.

The read control unit 122 receives a read command from the host 2 via the host I/F 11. The read control unit 122 may control the KEK generation unit 125, the DEK encryption/decryption unit 126, and the data encryption/decryption unit 127 to perform a read operation in accordance with the read command.

The read control unit 122 reads encrypted data in accordance with the read command from the NAND flash memory 5. The read control unit 122 acquires an encrypted DEK corresponding to the encrypted data from the encrypted DEK table 23.

The DEK generation unit 124 generates a DEK for encrypting user data by using the user data received along with the write command. For the DEK, a value originated from the user data (in other words, a value corresponding to the user data) is used, and a value such as a random number not originated from the user data is not used. For example, a hash value derived from user data or a hash-based message authentication code (HMAC) value may be used for the DEK. The DEK generation unit 124 applies, for example, a first hash function to the user data to generate a hash value.

The duplicate control unit 123 determines whether the user data received along with the write command is the same as plaintext data (hereinafter, also referred to as stored data) corresponding to encrypted data stored in the NAND flash memory 5. That is, the duplicate control unit 123 determines whether the received user data is duplicated data. Note that certain plaintext data corresponds to certain encrypted data when the certain encrypted data can be obtained by encrypting the certain plaintext data with a DEK.

More specifically, the duplicate control unit 123 calculates the hash value of the received user data. The duplicate control unit 123 determines whether the calculated hash value matches a hash value of plaintext data corresponding to encrypted data stored in the NAND flash memory 5. When the two hash values match each other, the duplicate control unit 123 determines that the received user data is duplicated data. On the other hand, when the two hash values do not match each other, the duplicate control unit 123 determines that the received user data is not duplicated data. The hash value of the plaintext data corresponding to the encrypted data stored in the NAND flash memory 5 is managed, for example, in the physical address versus hash value table 22.

FIG. 4 illustrates a configuration example of the physical address versus hash value table 22 used by the duplicate control unit 123. The physical address versus hash value table 22 may include a plurality of entries corresponding to a plurality of physical addresses. Each entry includes a physical address field and a hash value field.

In an entry corresponding to a certain physical address, a physical address field indicates the physical address. A hash value field indicates a hash value of plaintext data (user data) corresponding to encrypted data stored in the physical address.

The physical address versus hash value table 22 illustrated in FIG. 4 corresponds to the data arrangement 51 based on the physical address and the data arrangement 52 based on the logical address illustrated in FIG. 2.

In the example illustrated in FIG. 4, a hash value of user data corresponding to encrypted data stored the physical address "1" is "0980340". A hash value of user data corresponding to encrypted data stored in physical address "2" is "3412355". A hash value of user data corresponding to encrypted data stored in physical address "3" is "5154131".

In the entry corresponding to physical address "4", no value is set in the hash value field. This is because valid data is not stored in the physical address "4".

The data encryption/decryption unit 127 encrypts and decrypts data. The data encryption/decryption unit 127 encrypts data, which is to be written into the NAND flash memory via, for example, the NAND I/F 13. The data encryption/decryption unit 127 decrypts data (that is, encrypted data), which is read from the NAND flash memory 5 via the NAND I/F 13.

More specifically, when user data received along with a write command is not duplicated data, the data encryption/decryption unit 127 encrypts the user data with a DEK and thus acquires encrypted data. The encrypted data is written into the NAND flash memory 5 via the NAND I/F 13.

Note that the duplicate control unit 123 may calculate a hash value of the encrypted data (i.e., instead of plaintext user data) to determine whether the received user data is duplicated data. In this case, when the calculated hash value is included in any entry in the physical address versus hash value table 22, the duplicate control unit 123 determines that the received user data is duplicated data. When the calculated hash value is not included in any entry in the physical address versus hash value table 22, the duplicate control unit 123 determines that the received user data is not duplicated data.

When a hash value of user data, which is plaintext data, is used, the original user data might be specified from the hash value if the strength of the hash value is weak. However, when a hash value of encrypted data is used, it is difficult to specify original user data from the hash value. Therefore, the security can be further increased by using a hash value of encrypted data for determining whether data is duplicated.

The data encryption/decryption unit 127 decrypts encrypted data read from the NAND flash memory 5 with a DEK and thus acquires plaintext data. When the encrypted data is data read according to a read command, the acquired plaintext data is transmitted to the host 2.

The KEK generation unit 125 generates a KEK associated with a user who is using the host 2. The KEK is a key used to encrypt a DEK. The KEK generation unit 125 generates a KEK by using, for example, a password entered by the user using the host 2. The KEK generation unit 125 generates, for example, a hash value of the password as a KEK.

The DEK encryption/decryption unit 126 encrypts a DEK with a KEK and thus acquires an encrypted DEK. The encrypted DEK is stored into the encrypted DEK table 23 in association with a logical address specified by a write command.

The DEK encryption/decryption unit 126 decrypts the encrypted DEK acquired from the encrypted DEK table 23 with the KEK, and thus acquires the DEK. The DEK is used for decrypting encrypted data by the data encryption/decryption unit 127.

FIG. 5 illustrates a configuration example of the encrypted DEK table 23. The encrypted DEK table 23 includes one or more entries corresponding to one or more logical addresses. Each entry includes a logical address field and an encrypted DEK field.

In an entry corresponding to a certain logical address (hereinafter, referred to as a first logical address), a logical address field indicates the first logical address.

The encrypted DEK field indicates an encrypted DEK corresponding to the first logical address. When user data of the first logical address is required to be stored, the controller 4 encrypts the user data with a DEK and writes the encrypted user data into the NAND flash memory 5. The encrypted DEK is obtained by encrypting the DEK used to encrypt the user data with a KEK of a corresponding user.

Hereinafter, an operation upon receipt of a write command for requesting writing of second data from the host 2 when first encrypted data is stored in the NAND flash memory 5 will be described in detail as an example. Here, it is assumed that the first encrypted data is obtained by encrypting first data with a first DEK, which is an encryption key generated by using the first data.

The write control unit 121 receives a write command requesting writing of the second data from the host 2. The second data is received along with the write command. The second data is user data to be written into the NAND flash memory 5.

The duplicate control unit 123 determines whether the second data is the same as the first data. When the second data is the same as the first data, the DEK generation unit 124 generates the first DEK by using the second data. The KEK generation unit 125 generates different KEKs for different users. For example, when a first user (for example, the user A) is using the host 2, the KEK generation unit 125 generates a first KEK associated with the first user. The KEK generation unit 125 generates the first KEK by using, for example, a first password entered by the first user using the host 2. The DEK encryption/decryption unit 126 encrypts the first DEK with the first KEK and thus acquires a first encrypted DEK. The first encrypted DEK is stored into, for example, the encrypted DEK table 23. When a second user (for example, the user B) is using the host 2, the KEK generation unit 125 generates a second KEK associated with the second user. The KEK generation unit 125 generates the second KEK by using, for example, a second password entered by the second user using the host 2. The DEK encryption/decryption unit 126 encrypts the first DEK with the second KEK and thus acquires a second encrypted DEK. The second encrypted DEK is stored into, for example, the encrypted DEK table 23.

On the other hand, when the second data is different from the first data, the DEK generation unit 124 generates a second DEK by using the second data. The second DEK is different from the first DEK used to encrypt the first data. The data encryption/decryption unit 127 encrypts the second data with the second DEK and thus acquires second encrypted data. The write control unit 121 writes the second encrypted data into the NAND flash memory 5. When the first user is using the host 2, the KEK generation unit 125 generates the first KEK associated with the first user. The DEK encryption/decryption unit 126 encrypts the second DEK with the first KEK and thus acquires a third encrypted DEK. The third encrypted DEK is stored into, for example, the encrypted DEK table 23. When the second user is using the host 2, the KEK generation unit 125 generates the second KEK associated with the second user. The DEK encryption/decryption unit 126 encrypts the second DEK with the second KEK and thus acquires a fourth encrypted DEK. The fourth encrypted DEK is stored in, for example, the encrypted DEK table 23.

The read control unit 122 receives a read command for requesting reading of the second data.

When the second data is the same as the first data, the read control unit 122 reads the first encrypted data from the NAND flash memory 5. When the first user is using the host 2, the DEK encryption/decryption unit 126 decrypts the first encrypted DEK, corresponding to the first encrypted data, stored in the encrypted DEK table 23 with the first KEK and thus acquires the first DEK. When the second user is using the host 2, the DEK encryption/decryption unit 126 decrypts the second encrypted DEK, corresponding to the first encrypted data, stored in the encrypted DEK table 23 with the second KEK and thus acquires the first DEK. The data encryption/decryption unit 127 decrypts the read first encrypted data with the first DEK. The first data (=second data) obtained through the decryption is transmitted to the host 2.

On the other hand, when the second data is different from the first data, the read control unit 122 reads the second encrypted data from the NAND flash memory 5. When the first user is using the host 2, the DEK encryption/decryption unit 126 decrypts the third encrypted DEK, corresponding to the second encrypted data, stored in the encrypted DEK table 23 with the first KEK and thus acquires the second DEK. When the second user is using the host 2, the DEK encryption/decryption unit 126 decrypts the fourth encrypted DEK, corresponding to the second encrypted data, stored in the encrypted DEK table 23 with the second KEK and thus acquires the second DEK. The data encryption/decryption unit 127 decrypts the read second encrypted data with the second DEK. The second data obtained through the decryption is transmitted to the host 2.

Here, it is assumed that before receiving the above-described write command for requesting writing of the second data, the write control unit 121 receives a write command for requesting writing of the first data from the host 2 used by the second user. The first data is received along with the write command. The first data is user data to be written into the NAND flash memory 5.

Then, the DEK generation unit 124 generates the first DEK by using the first data. The data encryption/decryption unit 127 encrypts the first data with the first DEK and thus acquires the first encrypted data. The write control unit 121 writes the first encrypted data into the NAND flash memory 5. The KEK generation unit 125 generates the second KEK associated with the second user using the host 2. The KEK generation unit 125 generates the second KEK by using, for example, the second password entered by the second user using the host 2. The DEK encryption/decryption unit 126 encrypts the first DEK with the second KEK and thus acquires the second encrypted DEK. The second encrypted DEK is stored into, for example, the encrypted DEK table 23.

The read control unit 122 receives a read command requesting read of the first data from the host 2. It is assumed that the second user is requesting reading of the first data by using the read command.

The read control unit 122 reads the first encrypted data from the NAND flash memory 5 according to the read command. The DEK encryption/decryption unit 126 decrypts the second encrypted DEK stored in the encrypted DEK table 23 with the second KEK and thus acquires the first DEK. The data encryption/decryption unit 127 decrypts the read first encrypted data with the first DEK. The first data obtained through the decryption is transmitted to the host 2. Therefore, when the first data and the second data are the same as each other, both the first user and the second user may acquire the first data obtained by decrypting the first encrypted data from the SSD 3.

With the above configuration, the SSD 3 of the present embodiment can improve the storage efficiency while maintaining the confidentiality of data for each user. When the stored first data is the same as the second data received along with a new write request, the DEK generation unit 124 may generate the first DEK used to encrypt the first data, by using the second data. In this case, the second data encrypted with the first DEK is the same as the first data encrypted with the first DEK (that is, the first encrypted data). Therefore, it is not necessary to write the second data encrypted with the first DEK into the NAND flash memory 5, and deduplication can be achieved.

The DEK encryption/decryption unit 126 encrypts the first DEK with the first KEK and stores the first encrypted KEK. Consequently, it can be said that the first data (=second data) obtained by decrypting the first encrypted data in the NAND flash memory 5 is kept confidential by the first user associated with the first KEK for decrypting the first encrypted DEK. Therefore, even though the NAND flash memory 5 is physically taken out, the stored first encrypted data cannot be decrypted, and thus it is possible to prevent corresponding plaintext data from being leaked.

The above-described data deduplication and encryption functions are not limited to be executed by the controller 4 of the SSD 3, and may be installed in a file system driver or an operating system (OS) executed by various computing devices, or may be installed in a storage system that includes a plurality of SSDs and HDDs, which is owned by a company or implemented in a data center.

Some of the operations for deduplication and encryption of data performed by the controller 4 may be performed by the host 2. That is, the host 2 and the controller 4 may cooperate to achieve deduplication and encryption of data.

Next, three comparative examples will be described with reference to FIGS. 6 to 9. These comparative examples are executed by a storage device having a security function when accessed by a plurality of users. Specifically, a storage device according to a first comparative example is a non-encryption storage device having an access control function. A storage device according to a second comparative example is an encryption storage device that uses a DEK for each user. A storage device according to a third comparative example is an encryption storage device that uses a KEK for each user. Hereinafter, a description will be made of a case where deduplication is achieved by the storage device of each comparative example.

<Non-Encryption Storage Device Having Access Control Function>

Figure 6:
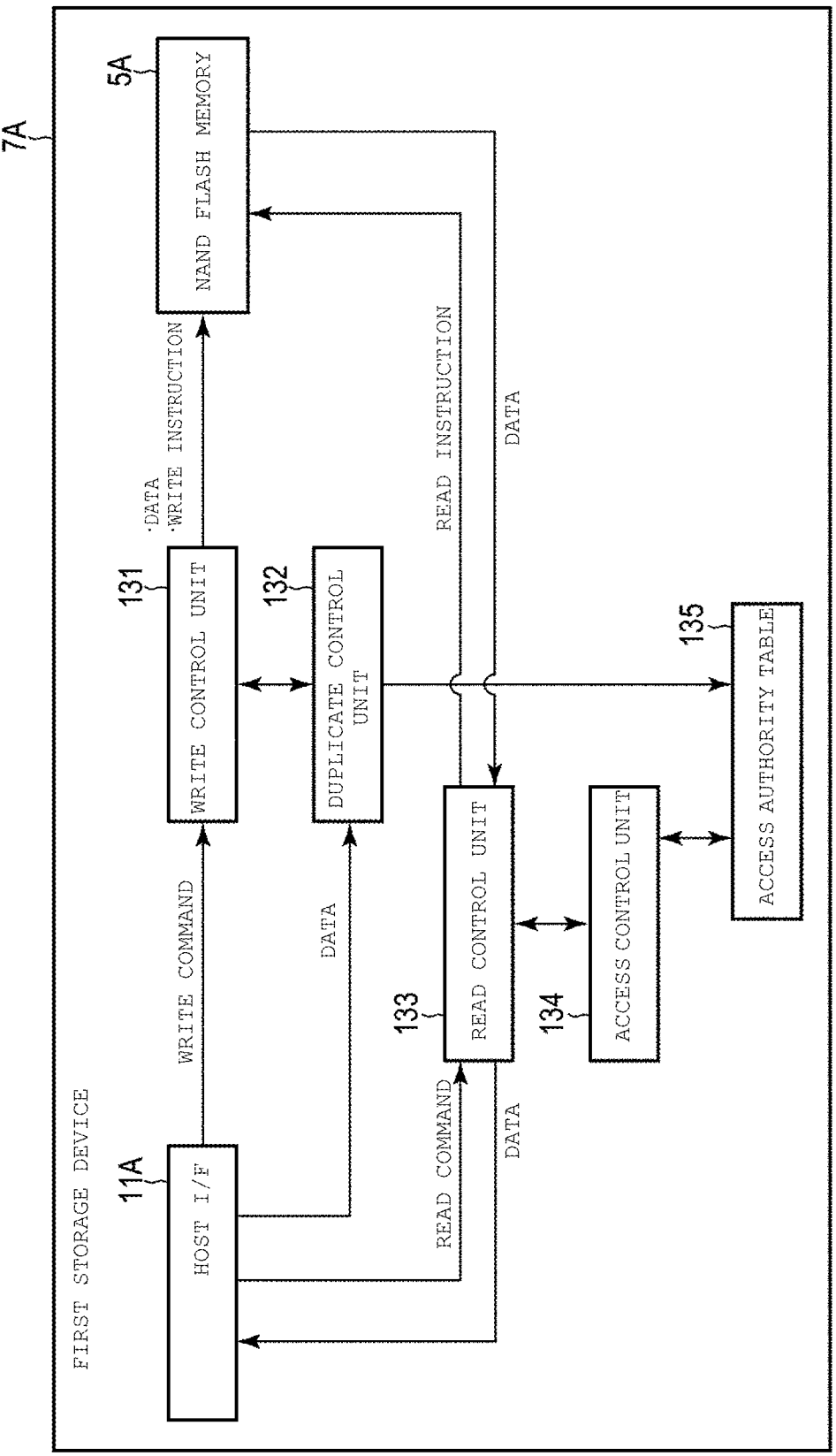
FIG. 6 is a block diagram illustrating examples of a write operation and a read operation in a storage device related to a first comparative example.

FIG. 6 is a block diagram illustrating examples of a write operation and a read operation in a storage device 7A (hereinafter, referred to as a first storage device 7A) according to the first comparative example. The first storage device 7A controls access to data by setting permission or denial for access of each user to data in a specific unit (for example, the block unit or the file unit).

The first storage device 7A includes a host I/F 11A, a NAND flash memory 5A, a write control unit 131, a duplicate control unit 132, a read control unit 133, an access control unit 134, an access authority table 135, and the like. The access authority table 135 indicates whether each user has an authority to access data in each specific unit stored in the NAND flash memory 5A.

The write control unit 131 receives a write command from the host 2 via the host I/F 11A. When the write control unit 131 receives the write command, the duplicate control unit 132 determines whether user data received along with the write command is duplicated data of plaintext data corresponding to encrypted data stored (stored data) in the NAND flash memory 5A.

When the duplicate control unit 132 determines that the user data is not duplicated data of the stored data, the write control unit 131 performs a write operation for writing the user data into the NAND flash memory 5A. That is, the write control unit 131 transfers the user data to the NAND flash memory 5A and sends a write instruction (more specifically, a program instruction) thereto. The duplicate control unit 132 updates the access authority table 135 so as to give a user who has requested writing of the user data by using the write command an authority to access the written user data.

On the other hand, when the duplicate control unit 132 determines that the user data is duplicated data of the stored data, the write control unit 131 skips the write operation for writing the user data into the NAND flash memory 5A. The duplicate control unit 132 updates the access authority table 135 so as to give the user the authority to access the stored data.

The read control unit 133 receives a read command from the host 2 via the host I/F 11A. When the read control unit 133 receives the read command, the access control unit 134 refers to the access authority table 135, and determines whether a user who has requested reading of the data by using the read command is given an authority to access the data.

When the access control unit 134 determines that the user is given the authority to access the data, the read control unit 133 performs a read operation of reading the data from the NAND flash memory 5A in accordance with the read command. More specifically, the read control unit 133 sends a read instruction to the NAND flash memory 5A. The read control unit 133 transmits the read data to the host 2.

On the other hand, when the access control unit 134 determines that the user is not given the authority to access the data, the read control unit 133 does not perform the read operation of reading the data from the NAND flash memory 5A in accordance with the read command. Consequently, it is possible to prevent illegal access from an unauthorized user.

As described above, in the first storage device 7A, it is possible to perform access control so that only an authorized user can access data while achieving deduplication.

However, plaintext data is stored in the NAND flash memory 5A of the first storage device 7A. Therefore, the first storage device 7A has a vulnerability that data can be easily stolen by physically taking out the NAND flash memory 5A (memory unit).

<Encryption Storage Device Using DEK for Each User>

Figure 7:
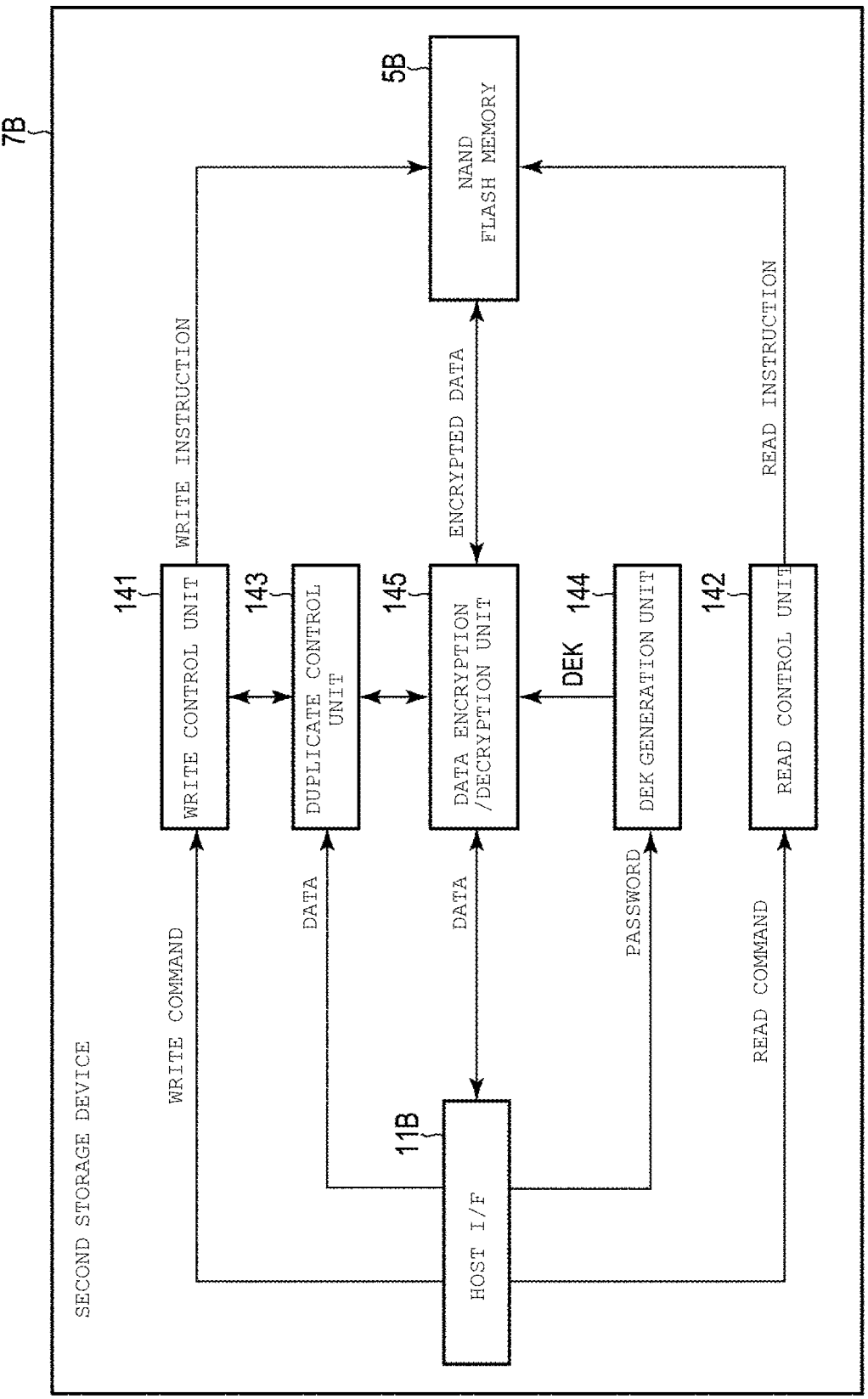
FIG. 7 is a block diagram illustrating examples of a write operation and a read operation in a storage device related to a second comparative example.

FIG. 7 is a block diagram illustrating examples of a write operation and a read operation in a storage device 7B (hereinafter, referred to as a second storage device 7B) according to the second comparative example. The second storage device 7B stores user data encrypted with a DEK unique to each user.

The second storage device 7B includes a host I/F 11B, a NAND flash memory 5B, a write control unit 141, a read control unit 142, a duplicate control unit 143, a DEK generation unit 144, a data encryption/decryption unit 145, and the like.

The DEK generation unit 144 generates a DEK associated with a user by using a password entered by the user using the host 2. The DEK generation unit 144 generates, for example, a hash value of the user's password as the DEK.

The write control unit 141 receives a write command from the host 2 via the host I/F 11B. When the write control unit 141 receives the write command, the duplicate control unit 143 determines whether user data received along with the write command is duplicated data of plaintext data corresponding to encrypted data stored (stored data) in the NAND flash memory 5B.

When the duplicate control unit 143 determines that the user data is not duplicated data of the stored data, the data encryption/decryption unit 145 encrypts the user data with the DEK. This DEK is a DEK associated with the user who has requested writing of the user data by using the write command.

The data encryption/decryption unit 145 transfers the encrypted user data to the NAND flash memory 5B, and the write control unit 141 sends a write instruction for writing the encrypted user data to the NAND flash memory 5B. Consequently, user data encrypted with a DEK unique to each user can be stored into the NAND flash memory 5B.

On the other hand, when the duplicate control unit 143 determines that the user data is duplicated data of the stored data, the data encryption/decryption unit 145 does not encrypt the user data. The write control unit 141 skips the write operation for writing the encrypted user data into the NAND flash memory 5B.

The read control unit 142 receives a read command from the host 2 via the host I/F 11B. The read control unit 142 performs a read operation for reading data in accordance with the read command. More specifically, the read control unit 142 sends a read instruction to the NAND flash memory 5B.

The data encryption/decryption unit 145 performs a process for decrypting encrypted data that is read through the read operation with the DEK. The encrypted data is encrypted with a DEK unique to each user. Therefore, when the DEK associated with the user who has requested reading of the data by using the read command matches the DEK used to encrypt the encrypted data, the data encryption/decryption unit 145 succeeds in decrypting the encrypted data. On the other hand, when the DEK associated with the user does not match the DEK used to encrypt the encrypted data, the data encryption/decryption unit 145 fails to decrypt the encrypted data.

As described above, the second storage device 7B can prevent the same data from being written into the NAND flash memory 5 in duplicate. However, in the second storage device 7B, since the data is encrypted by a DEK for each user, the encrypted data cannot be shared by a plurality of users. That is, certain encrypted data can be decrypted with only a DEK of one user used for encryption thereof.

Thus, when a write operation for writing user data is skipped because the user data received with a new write command is duplicated data of stored data, a new user who has requested writing by using the new write command cannot acquire the user data from the second storage device 7B. This is because encrypted data corresponding to stored data cannot be decrypted with a DEK associated with the new user.

As described above, since encrypted data cannot be shared by a plurality of users, deduplication cannot be achieved in the second storage device 7B.

<Encryption Storage Device Using KEK for Each User>

Figure 8:
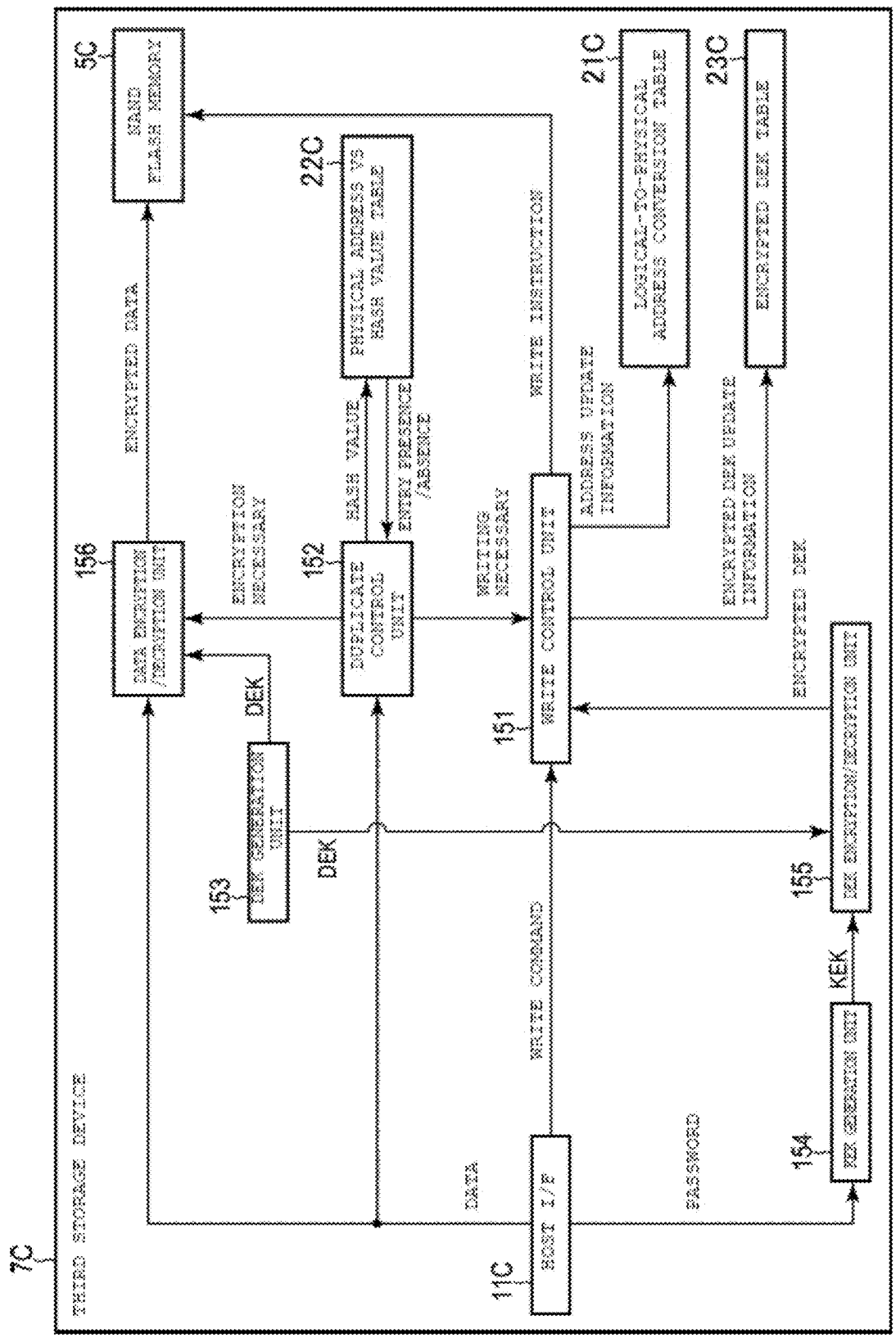
FIG. 8 is a block diagram illustrating an example of a write operation when there is no duplicated data in a storage device related to a third comparative example.

FIG. 8 is a block diagram illustrating an example of a write operation in a storage device 7C (hereinafter, referred to as a third storage device 7C) according to the third comparative example when there is no duplicated data stored. The third storage device 7C encrypts a DEK for encrypting user data, with a KEK unique to each user, and stores the DEK.

The third storage device 7C includes a host I/F 11C, a NAND flash memory 5C, a write control unit 151, a duplicate control unit 152, a DEK generation unit 153, a KEK generation unit 154, a DEK encryption/decryption unit 155, and a data encryption/decryption unit 156, a logical-to-physical address conversion table 21C, a physical address versus hash value table 22C, an encrypted DEK table 23C, and the like.

The KEK generation unit 154 uses a password entered by a user using the host 2 to generate a KEK associated with the user. The KEK generation unit 154 generates, for example, a hash value of the user's password as the KEK. The KEK generation unit 154 sends the generated KEK to the DEK encryption/decryption unit 155.

The write control unit 151 receives a write command from the host 2 via the host I/F 11C.

When the write control unit 151 receives the write command, the DEK generation unit 153 generates a DEK unique to each piece of user data in a specific unit. The specific unit is, for example, an area, a block, or a file. The DEK generation unit 153 generates, for example, a random number as the DEK. The DEK generation unit 153 sends the generated DEK to the data encryption/decryption unit 156 and the DEK encryption/decryption unit 155.

When the write control unit 151 receives the write command, the duplicate control unit 152 determines whether user data received along with the write command is duplicated data of plaintext data corresponding to encrypted data stored (stored data) in the NAND flash memory 5C.

When the duplicate control unit 152 determines that the user data is not duplicated data of the stored data, the data encryption/decryption unit 156 encrypts the user data with the DEK. The data encryption/decryption unit 156 transfers the encrypted user data to the NAND flash memory 5C, and the write control unit 151 sends a write instruction for writing the encrypted user data to the NAND flash memory 5C. Consequently, user data encrypted with a DEK unique to each piece of user data in the specific unit can be stored into the NAND flash memory 5C.

The DEK encryption/decryption unit 155 encrypts the DEK with the KEK and thus acquires an encrypted DEK. This KEK is a KEK associated with a user who has requested writing of the user data by using the write command. The DEK encryption/decryption unit 155 sends the encrypted DEK to the write control unit 151. The write control unit 151 stores the encrypted DEK into the encrypted DEK table 23C. In the encrypted DEK table 23C, for example, an encrypted DEK associated with a logical address specified by a write command is stored.

As illustrated in FIG. 8, when there is no stored duplicated data of the user data to be written, the third storage device 7C encrypts the user data with the random number DEK, writes the user data into the NAND flash memory 5C, and encrypts the DEK with the KEK for each user and stores the encrypted DEK.

Figure 9:
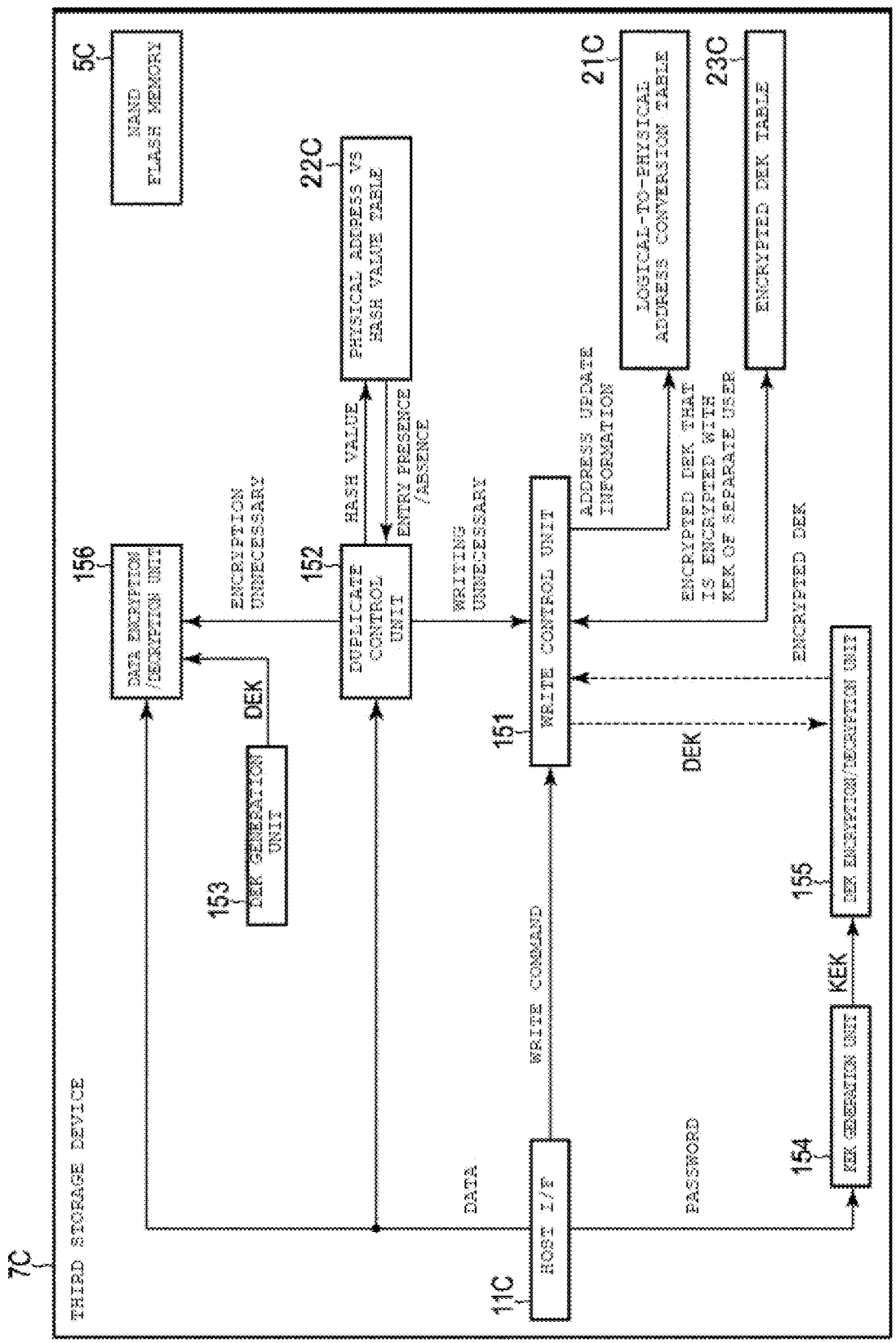
FIG. 9 is a block diagram illustrating an example in which a write operation cannot be implemented when there is duplicated data in a storage device related to the third comparative example.

FIG. 9 is a block diagram illustrating an example in which a write operation cannot be implemented when there is duplicate data stored in the third storage device 7C.

When the duplicate control unit 152 determines that user data is duplicated data of stored data, the data encryption/decryption unit 156 does not encrypt the user data. The write control unit 151 skips a write operation for writing the encrypted user data into the NAND flash memory 5C.

In this case, the write control unit 151 and the DEK encryption/decryption unit 155 are required to encrypt the DEK used to encrypt the encrypted data corresponding to the stored data with the KEK of a new user who has requested writing of the user data by using the write command and store the encrypted DEK into the encrypted DEK table 23C. However, the DEK that is a random number is encrypted with another user's KEK and is stored in the encrypted DEK table 23C. The DEK encryption/decryption unit 155 cannot decrypt the encrypted DEK that is encrypted with another user's KEK, with the current user's KEK. Thus, the write control unit 151 cannot store the DEK encrypted with the current user's KEK into the encrypted DEK table 23C. Then, when the current user requests reading of the user data by using a read command, since a corresponding encrypted DEK is not stored in the encrypted DEK table 23C, the user data cannot be acquired from the third storage device 7C.

As mentioned above, since a DEK used to encrypt certain user data (that is, a data pattern) cannot be shared by a plurality of users, deduplication cannot be achieved in the third storage device 7C.

In contrast to the storage devices 7A, 7B, and 7C of the first to third comparative examples, the controller 4 of the SSD 3 of the present embodiment generates a DEK based on user data, encrypts the DEK with a KEK unique to each user, and stores the encrypted DEK. Since the DEK is not a random number and is derived from user data, a plurality of users who try to write user data with the same pattern can share the DEK corresponding to the user data. The user data is encrypted with the shared DEK, and thus a plurality of users can share the encrypted data.

Since the controller 4 encrypts the DEK with a KEK for each user and stores the encrypted DEK, for example, when a password for generating the KEK is correctly entered, the encrypted DEK can be decrypted, but, when the password is not entered correctly, the encrypted DEK cannot be decrypted. Therefore, since the encrypted DEK cannot be decrypted in illegal access, even though encrypted data in the NAND flash memory 5 is read, it is possible to prevent the encrypted data from being decrypted and plaintext data from being leaked.

As described above, the SSD 3 of the present embodiment can improve storage efficiency while maintaining the confidentiality of data for each user.

Figure 10:
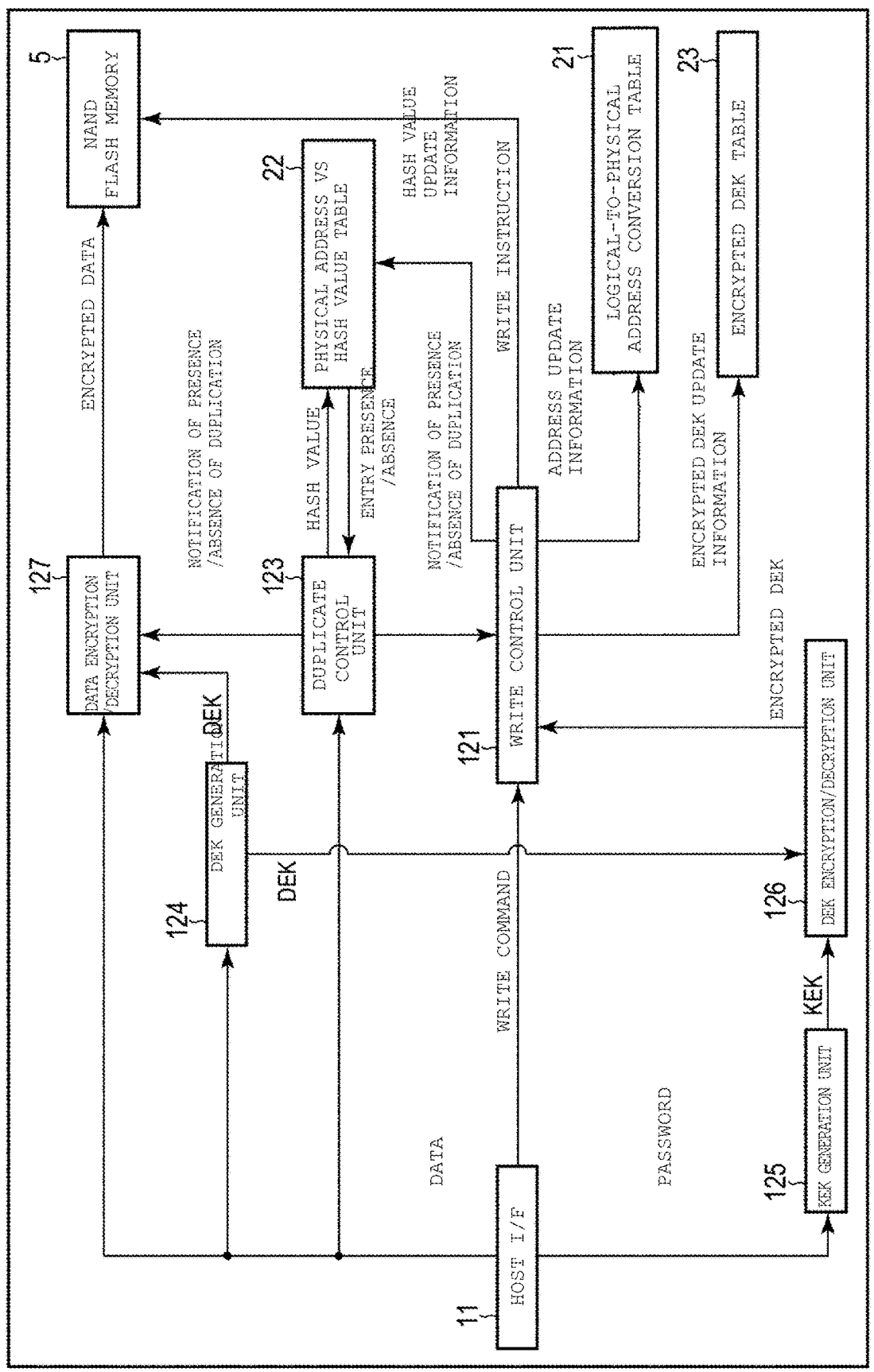
FIG. 10 is a block diagram illustrating an example of a write operation in the memory system of the first embodiment.

FIG. 10 is a block diagram illustrating an example of a write operation in the SSD 3. The KEK generation unit 125 generates a KEK associated with a user by using a password entered by the user using the host 2. The KEK generation unit 125 generates, for example, a hash value of the user's password as the KEK. The KEK generation unit 125 sends the generated KEK to the DEK encryption/decryption unit 126.

The write control unit 121 receives a write command from the host 2 via the host I/F 11.

When the write control unit 121 receives the write command, the DEK generation unit 124 uses user data received along with the write command to generate a DEK. The DEK generation unit 124 uses, for example, a first hash value calculated by applying a first hash function to the user data, as the DEK. The user data is data in a specific unit, such as an area, a block, or a file. The DEK generation unit 124 sends the generated DEK to the data encryption/decryption unit 127 and the DEK encryption/decryption unit 126.

When the write control unit 121 receives the write command, the duplicate control unit 123 determines whether the user data received along with the write command is the same as plaintext data (stored data) corresponding to encrypted data stored in the NAND flash memory 5.

Specifically, the duplicate control unit 123 calculates a second hash value, for example, by applying a second hash function to the user data. The second hash function is different from, for example, the first hash function described above. The duplicate control unit 123 determines whether there is an entry including the calculated second hash value in the physical address versus hash value table 22. When there is an entry including the second hash value in the physical address versus hash value table 22, the duplicate control unit 123 determines that the user data is the same as the stored data. On the other hand, when there is no entry including the second hash value in the physical address versus hash value table 22, the duplicate control unit 123 determines that the user data is different from the stored data.

<Case where User Data is Different from Stored Data>

When the duplicate control unit 123 determines that the user data is different from the stored data, the data encryption/decryption unit 127 encrypts the user data with the DEK. This DEK is different from a DEK used to encrypt the stored data. The data encryption/decryption unit 127 transfers the encrypted user data to the NAND flash memory 5, and the write control unit 121 sends a write instruction for writing the encrypted user data to the NAND flash memory 5. Consequently, the user data encrypted with the DEK derived from the user data can be written into the NAND flash memory 5.

The write control unit 121 updates the logical-to-physical address conversion table 21 and the physical address versus hash value table 22 according to writing of the user data. Specifically, the write control unit 121 updates the logical-to-physical address conversion table 21 to indicate mapping between a logical address specified by the write command and a physical address in which the user data is written. The write control unit 121 updates the physical address versus hash value table 22 to indicate a correspondence between the physical address in which the user data is written and the second hash value of the user data.

The DEK encryption/decryption unit 126 encrypts the DEK with the KEK and thus acquires an encrypted DEK. This KEK is a KEK associated with a user who has requested writing of the user data by using the write command. The DEK encryption/decryption unit 126 sends the encrypted DEK to the write control unit 121.

The write control unit 121 stores the encrypted DEK into the encrypted DEK table 23. In the encrypted DEK table 23, for example, an encrypted DEK associated with a logical address specified by a write command is stored.

When the user data is different from the stored data as mentioned above, the controller 4 encrypts the user data with the DEK generated by using the user data and writes the user data into the NAND flash memory 5. The controller 4 encrypts the DEK with the KEK associated with the user who has requested writing of the user data by using the write command, and stores the encrypted DEK into the encrypted DEK table 23.

<Case where User Data is the Same as Stored Data>

When the duplicate control unit 123 determines that the user data is the same as the stored data, the data encryption/decryption unit 127 does not encrypt the user data. The write control unit 121 skips a write operation for writing the encrypted user data into the NAND flash memory 5. That is, the write control unit 121 does not send a write instruction to the NAND flash memory 5.

The write control unit 121 updates the logical-to-physical address conversion table 21 to indicate mapping between a logical address specified by the write command and a physical address in which the encrypted data obtained by encrypting the stored data is stored. Since no new physical writing has occurred, the write control unit 121 does not update the physical address versus hash value table 22.

The DEK encryption/decryption unit 126 encrypts a DEK with the KEK and thus acquires the encrypted DEK. The DEK is the same as a DEK used to encrypt the stored data. The KEK is a KEK associated with the user who has requested writing of the user data by using the write command. The DEK encryption/decryption unit 126 sends the encrypted DEK to the write control unit 121.

The write control unit 121 stores the encrypted DEK into the encrypted DEK table 23. In the encrypted DEK table 23, for example, an encrypted DEK associated with a logical address specified by a write command is stored.

As described above, when the user data is the same as the stored data, the controller 4 does not encrypt the user data and does not write the user data into the NAND flash memory 5. However, the controller 4 encrypts the DEK generated by using the user data with the KEK associated with the user who has requested writing of the user data by using the write command, and stores the encrypted DEK into the encrypted DEK table 23.

Therefore, when the user data is the same as the stored data, the controller 4 does not perform an operation for writing the user data into the NAND flash memory 5, and can thus achieve deduplication. The controller 4 generates the DEK used to encrypt the stored data by using the user data, encrypts the DEK with the KEK associated with the user, and stores the encrypted DEK. Therefore, it can be said that the stored data that is the same as the user data is kept confidential by the user associated with the KEK.

As described above, a write operation differs according to whether the user data is the same as the stored data. For example, when the user data is the same as the stored data, an operation of encrypting the user data and writing the user data into the NAND flash memory 5 is not performed. In this case, a processing time in accordance with a write command is shorter and thus power consumption is lower than when the user data is different from the stored data.

Thus, when a certain user requests writing of certain user data by using a write command and a write operation is performed in accordance with the request, there is a possibility that the user data can be estimated to be duplicated data of stored data based on the processing time and power consumption, which might result in a security problem.

To address such a problem, even when user data is the same as stored data, the write control unit 121 and the data encryption/decryption unit 127 may perform a dummy encryption process or a write operation so that such an estimation cannot be made. Specifically, the data encryption/decryption unit 127 may encrypt dummy data with a DEK and thus acquires dummy encrypted data. Then the write control unit 121 may write the dummy encrypted data into the NAND flash memory 5.

Consequently, it is possible to reduce a difference in a processing time or power consumption that occurs between when user data is different from stored data and when the user data is the same as the stored data. Therefore, it cannot be estimated whether user data requested to be written is the same as stored data.

Figure 11:
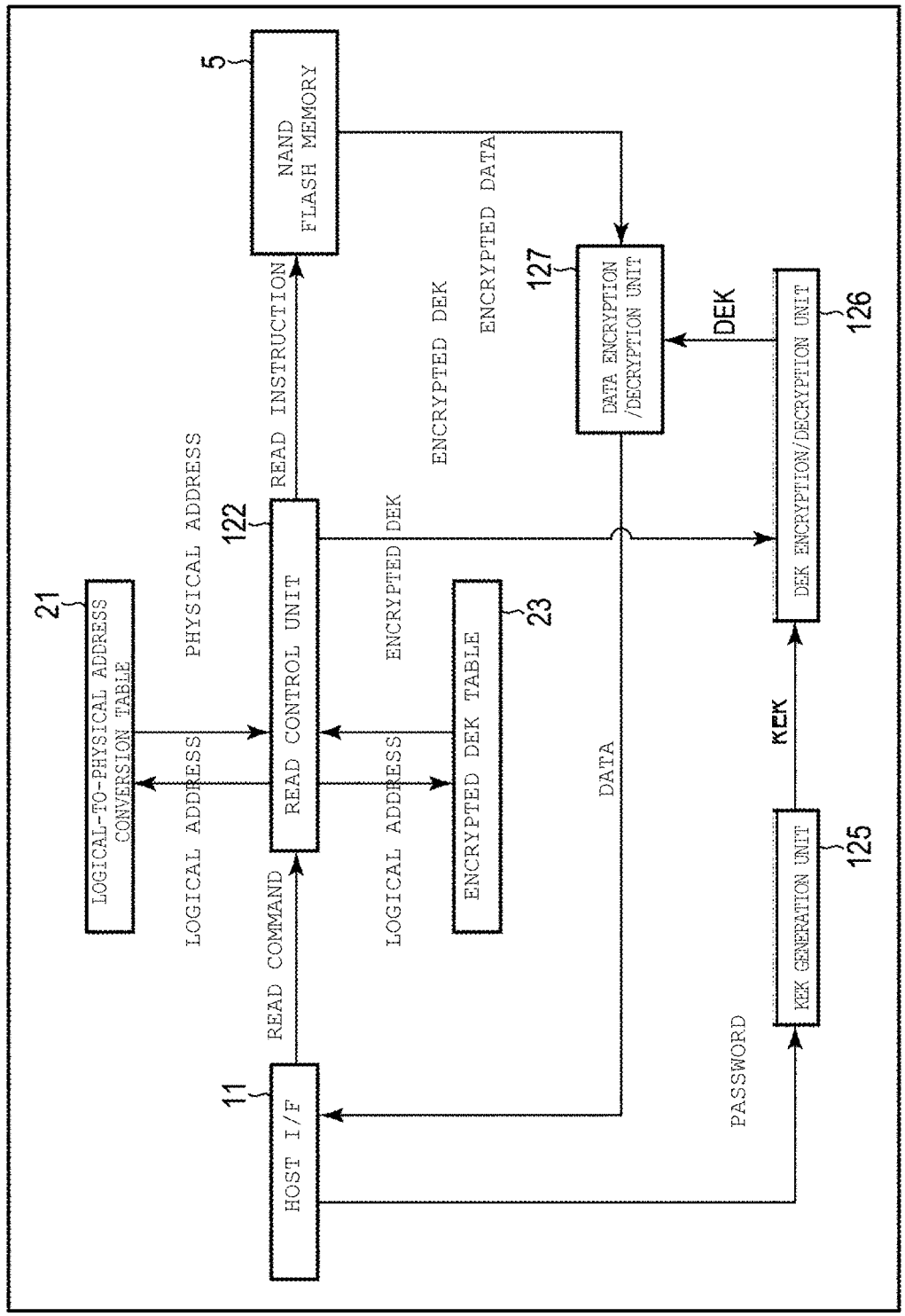
FIG. 11 is a block diagram illustrating an example of a read operation in the memory system of the first embodiment.

FIG. 11 is a block diagram illustrating an example of a read operation in the SSD 3. The KEK generation unit 125 uses a password entered by a user using the host 2 to generate a KEK associated with the user. The KEK generation unit 125 generates, for example, a hash value of the user's password as the KEK. The KEK generation unit 125 sends the generated KEK to the DEK encryption/decryption unit 126.

The read control unit 122 receives a read command from the host 2 via the host I/F 11. The read control unit 122 performs a read operation for reading data in accordance with the read command.

Specifically, the read control unit 122 converts a logical address specified by the read command into a corresponding physical address by using the logical-to-physical address conversion table 21. The read control unit 122 sends a read instruction for reading data from this physical address to the NAND flash memory 5. Consequently, encrypted data in accordance with the read command is read from the NAND flash memory 5.

The read control unit 122 uses the encrypted DEK table 23 to acquire an encrypted DEK associated with the logical address specified by the read command. The read control unit 122 sends the acquired encrypted DEK to the DEK encryption/decryption unit 126.

The DEK encryption/decryption unit 126 decrypts the encrypted DEK with the KEK and thus acquires the DEK. The KEK is a KEK associated with the user who has requested reading of user data by using the read command. The DEK encryption/decryption unit 126 sends the acquired DEK to the data encryption/decryption unit 127.

The data encryption/decryption unit 127 decrypts the encrypted data read from the NAND flash memory 5 according to the read instruction with the DEK to acquire plaintext user data. The data encryption/decryption unit 127 transmits the user data to the host 2 via the host I/F 11.

Consequently, the user using the host 2 can acquire the user data in accordance with the read command by using the KEK associated with the user.

When the KEK associated with the user is different from a KEK used to encrypt the encrypted DEK, the DEK encryption/decryption unit 126 fails to decrypt the encrypted DEK. In this case, the data encryption/decryption unit 127 cannot decrypt encrypted data read from the NAND flash memory 5. Therefore, for example, in illegal access in which a correct password is not entered, the KEK used to encrypt the encrypted DEK cannot be generated, and thus the encrypted DEK cannot be decrypted and the encrypted data cannot be decrypted. Consequently, it is possible to prevent encrypted data from being decrypted and plaintext user data from being leaked.

With the configurations illustrated in FIGS. 10 and 11, the SSD 3 can improve storage efficiency while maintaining the confidentiality of data for each user.

Figure 12:
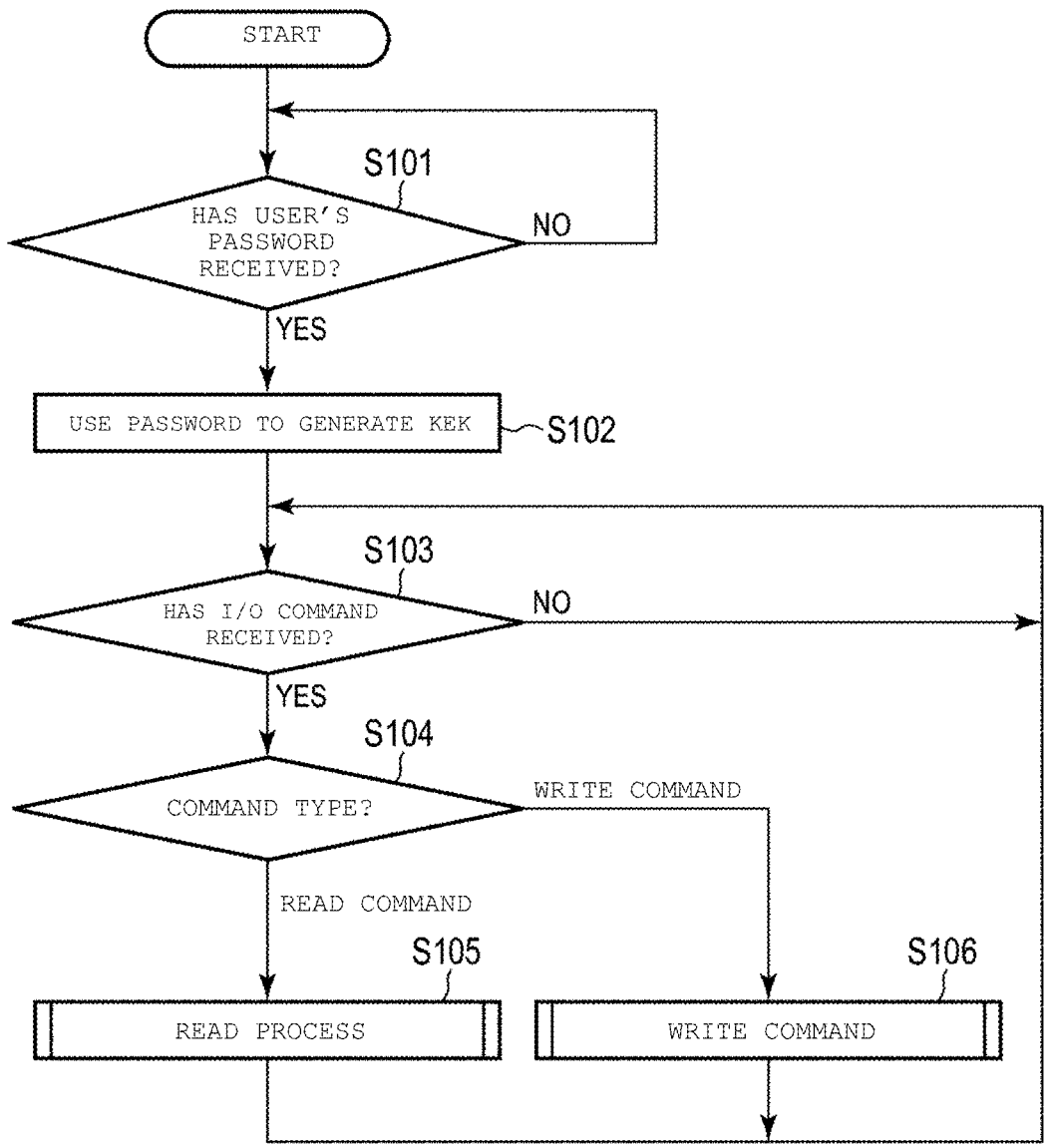
FIG. 12 is a flowchart illustrating an example of a procedure of a control process executed in the memory system of the first embodiment.

FIG. 12 is a flowchart illustrating an example of a procedure of a control process executed by the controller 4. The control process is started according to, for example, establishment of connection between the SSD 3 and the host 2.

The controller 4 determines whether a user's password has been received from the host 2 (step S101). When the password has not been received (NO in step S101), the controller 4 returns to step S101 and determines again whether the password has been received.

On the other hand, when the password has been received (YES in step S101), the controller 4 generates a KEK by using the password (step S102). The controller 4 generates, for example, a hash value of the password as the KEK. Consequently, the controller 4 can encrypt a DEK and also decrypt the encrypted DEK by using the KEK.

Next, the controller 4 determines whether an I/O command has been received from the host 2 (step S103). When the I/O command has not been received (NO in step S103), the controller 4 returns to step S103 and determines again whether the I/O command has been received.

On the other hand, when the I/O command has been received (YES in step S103), the controller 4 branches the process according to the type of the received I/O command (step S104). When the received I/O command is a read command (read command in step S104), the controller 4 executes a read process (step S105). The read process is a process for acquiring data in accordance with the read command and transmitting the data to the host 2. A detailed procedure of the read process will be described later with reference to a flowchart of FIG. 13.

When the received I/O command is a write command (write command in step S104), the controller 4 executes a write process (step S106). The write process is a process for storing user data received along with the write command into the NAND flash memory 5 by performing deduplication and encryption. A detailed procedure of the write process will be described later with reference to a flowchart of FIG. 14.

After the read process in step S105 is executed or the write process in step S106 is executed, the controller 4 returns to step S103. Consequently, the controller 4 can continue a process in accordance with a read command or a write command that will be received.

Through the above control process, the controller 4 can generate a KEK for each user to be used to encrypt and decrypt the DEK, and perform a read process in accordance with a read command and a write process in accordance with a write command. The procedures from step S101 to step S102 may be performed at any timing before a procedure for decrypting the encrypted DEK in the read process in step S105 (step S204 in FIG. 13 described later) and a procedure for encrypting the DEK in the write process in step S106 (step S310 in FIG. 14 described later).

Figure 13:
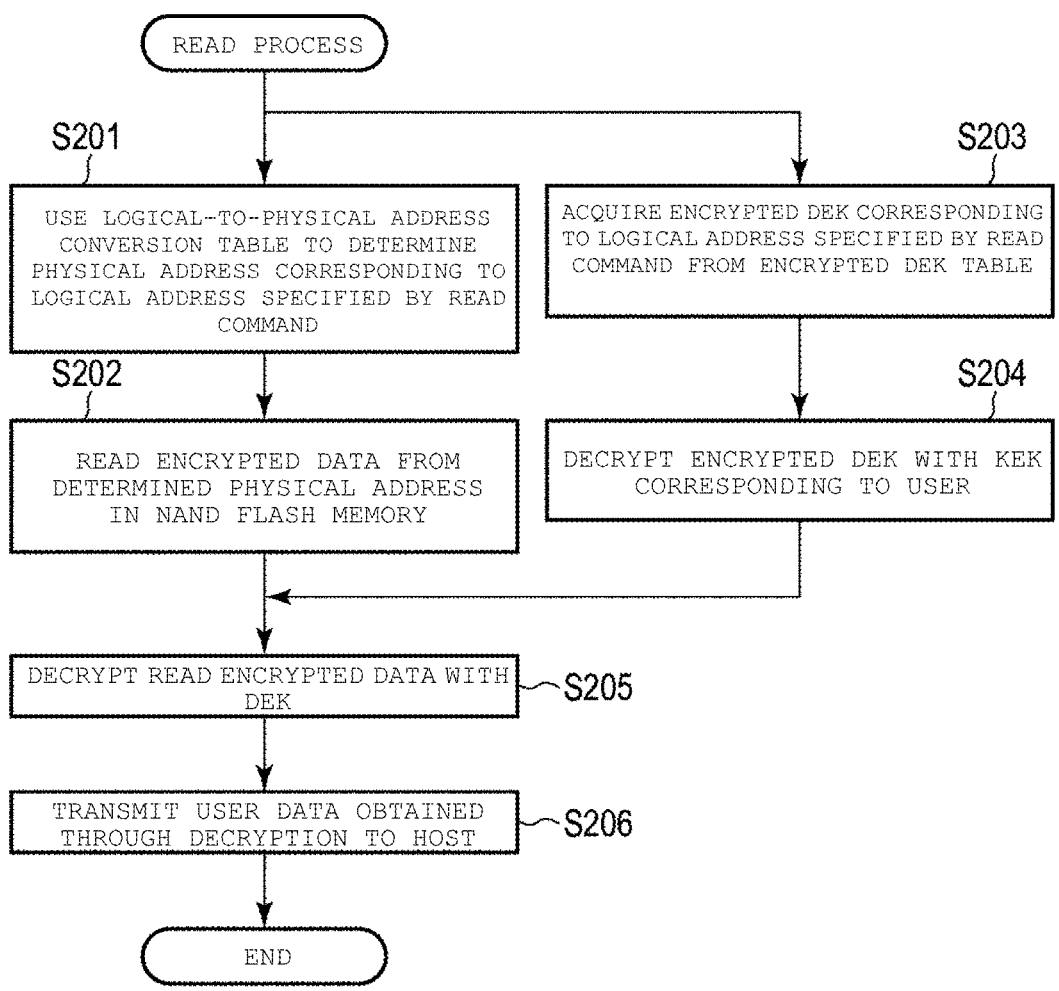
FIG. 13 is a flowchart illustrating an example of a procedure of a read process executed in the memory system of the first embodiment.

FIG. 13 is a flowchart illustrating an example of a procedure of the read process executed by the controller 4. The read process corresponds to step 105 of the control process described above with reference to the flowchart of FIG. 12.

The controller 4 uses the logical-to-physical address conversion table 21 to determine a physical address corresponding to a logical address specified by the read command (step S201). The controller 4 reads encrypted data from the determined physical address in the NAND flash memory 5 (step S202).

The controller 4 acquires an encrypted DEK corresponding to the logical address specified by the read command from the encrypted DEK table 23 (step S203). The controller 4 decrypts the encrypted DEK with the KEK corresponding to the user (step S204). The KEK is generated by using the password entered by the user using the host 2. The encrypted DEK can be decrypted with only the KEK used for encrypting the DEK to generate the encrypted DEK. Thus, when a wrong password is received from the host 2, or when the encrypted DEK cannot be correctly decrypted with the KEK, the controller 4 may determine that the access is illegal and stop the read process.

The controller 4 can perform the procedures in steps S201-S202 and the procedures in steps S203-S204 in parallel, in various embodiments. The controller 4 may perform the procedures in step S203 and step S204 after performing the procedures in step S201 and step S202, in some other embodiments. The controller 4 may perform the procedures in step S201 and step S202 after performing the procedures in step S203 and step S204, in some yet other embodiments.

Next, the controller 4 decrypts the read encrypted data with the DEK (step S205). The controller 4 transmits plaintext user data obtained through the decryption to the host 2 (step S206).

Through the read process, the controller 4 can read the encrypted data from the NAND flash memory 5 according to the read command and transmit plaintext user data obtained by decrypting the encrypted data to the host 2. A DEK obtained by decrypting an encrypted DEK with a KEK unique to each user is used to decrypt the encrypted data. Thus, encrypted data is not decrypted in illegal access in which a KEK of a corresponding user cannot be obtained. Therefore, it can prevent plaintext user data from being leaked due to illegal access.

Figure 14:
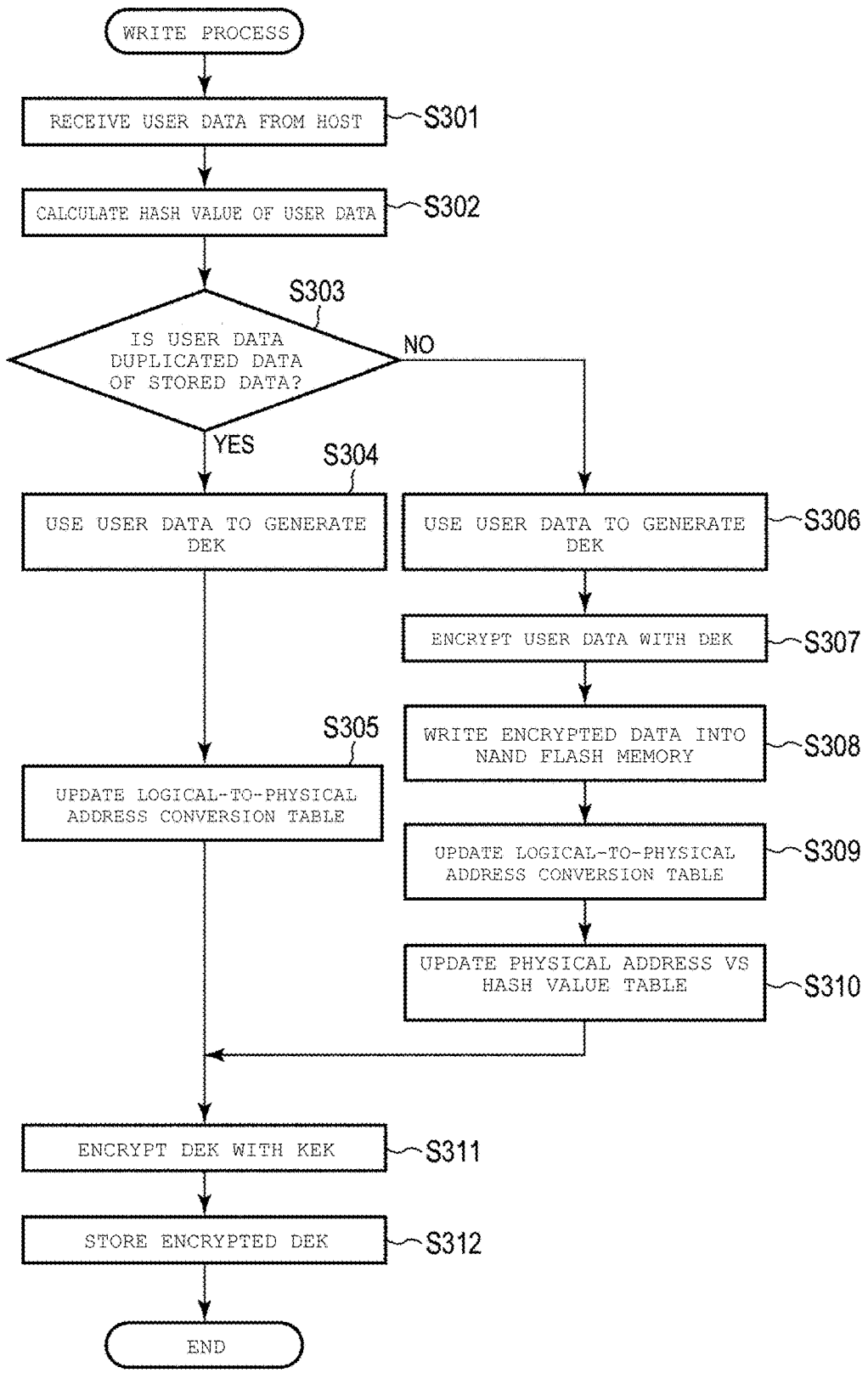
FIG. 14 is a flowchart illustrating an example of a procedure of a write process executed in the memory system of the first embodiment.

FIG. 14 is a flowchart illustrating an example of a procedure of the write process executed by the controller 4. The write process corresponds to step S106 of the control process described above with reference to the flowchart of FIG. 12.

The controller 4 receives user data to be written into the NAND flash memory 5 from the host 2 (step S301). The controller 4 calculates a hash value of the user data (step S302).

The controller 4 uses the calculated hash value and the physical address versus hash value table 22 to determine whether the received user data is duplicated data of plaintext data (stored data) corresponding to the encrypted data stored in the NAND flash memory 5 (step S303). That is, the controller 4 determines whether data having the same pattern as that of the received user data has been encrypted and stored in the NAND flash memory 5.

When the user data is duplicated data of the stored data (YES in step S303), the controller 4 generates a DEK by using the user data (step S304). The controller 4 generates, for example, a hash value of the user data as the DEK. The controller 4 updates the logical-to-physical address conversion table 21 such that the logical address specified by the write command is associated (that is, mapped) with the physical address in which the encrypted data corresponding to the stored data is written (step S305). Consequently, a single physical address in which the encrypted data is written can be associated with a plurality of logical address.

When the user data is not duplicated data of the stored data (NO in step S303), the controller 4 generates a DEK by using the user data (step S306). The controller 4 encrypts the user data with the DEK (step S307), and writes the encrypted user data (encrypted data) into the NAND flash memory 5 (step S308). The controller 4 updates the logical-to-physical address conversion table 21 such that the logical address specified by the write command is associated (that is, mapped) with the physical address in which the encrypted data is written (step S309). The controller 4 updates the physical address versus hash value table 22 (step S310). More specifically, when there is an entry including the physical address in which the encrypted data is written in the physical address versus hash value table 22, the controller 4 sets the hash value of the user data calculated in step S302 in a hash value field of the entry.

After the logical-to-physical address conversion table 21 is updated in step S305 or the physical address versus hash value table 22 is updated in step S310, the controller 4 encrypts the DEK with the KEK corresponding to the user (step S311). The KEK is generated by using the password entered by the user using the host 2. The controller 4 stores the encrypted DEK (step S312). More specifically, when there is no entry in the encrypted DEK table 23 including the logical address (that is, the logical address specified by the write command) corresponding to the user data, the controller 4 adds an entry including the logical address and the encrypted DEK to the encrypted DEK table 23. When there is an entry including the logical address corresponding to the user data in the encrypted DEK table 23, the controller 4 sets the encrypted DEK obtained in step S310 in an encrypted DEK field of the entry.

Through the write process, the controller 4 skips the process of encrypting the user data and the process of writing the encrypted data into the NAND flash memory 5 when the user data received along with the write command is duplicated data of the stored data such that deduplication can be achieved.

The controller 4 uses user data to generate a DEK regardless of whether the user data is duplicated data of stored data. Consequently, encrypted data obtained by encrypting the user data with the DEK can be shared by a plurality of users who have requested writing of the user data having the same pattern.

The controller 4 encrypts a DEK with a KEK unique to each user and stores the encrypted DEK. Therefore, it is necessary to decrypt a stored encrypted DEK with a KEK for each user to decrypt encrypted data. Therefore, a user can keep user data obtained by decrypting the encrypted data with the DEK confidential by using the KEK (or a password for deriving the KEK).

Second Embodiment

In the first embodiment, a DEK is generated by using user data to be written into the NAND flash memory 5. On the other hand, in the second embodiment, the DEK is generated by using the user data to be written into the NAND flash memory 5 and a key derivation key (KDK) unique to each SSD.

The controller 4 (more specifically, the DEK generation unit 124) can generate a certain DEK only when corresponding user data is present. Therefore, the controller 4 cannot generate the DEK when the corresponding user data is not present.

However, for example, a user with knowledge of hashes can generate a DEK corresponding to user data on the host 2. Thus, there may be an operational vulnerability that the DEK is leaked due to the user's inadequacy.

Thus, the SSD 3 according to the second embodiment uses not only user data but also a KDK unique to each SSD to generate a DEK. Consequently, the strength of encryption of user data using the DEK can be increased.

A configuration of the SSD 3 according to the second embodiment is the same as that of the SSD 3 of the first embodiment, and only a configuration for generating a DEK by further using a KDK is different between the second embodiment and the first embodiment. Hereinafter, description will focus on differences from the first embodiment.

Figure 15:
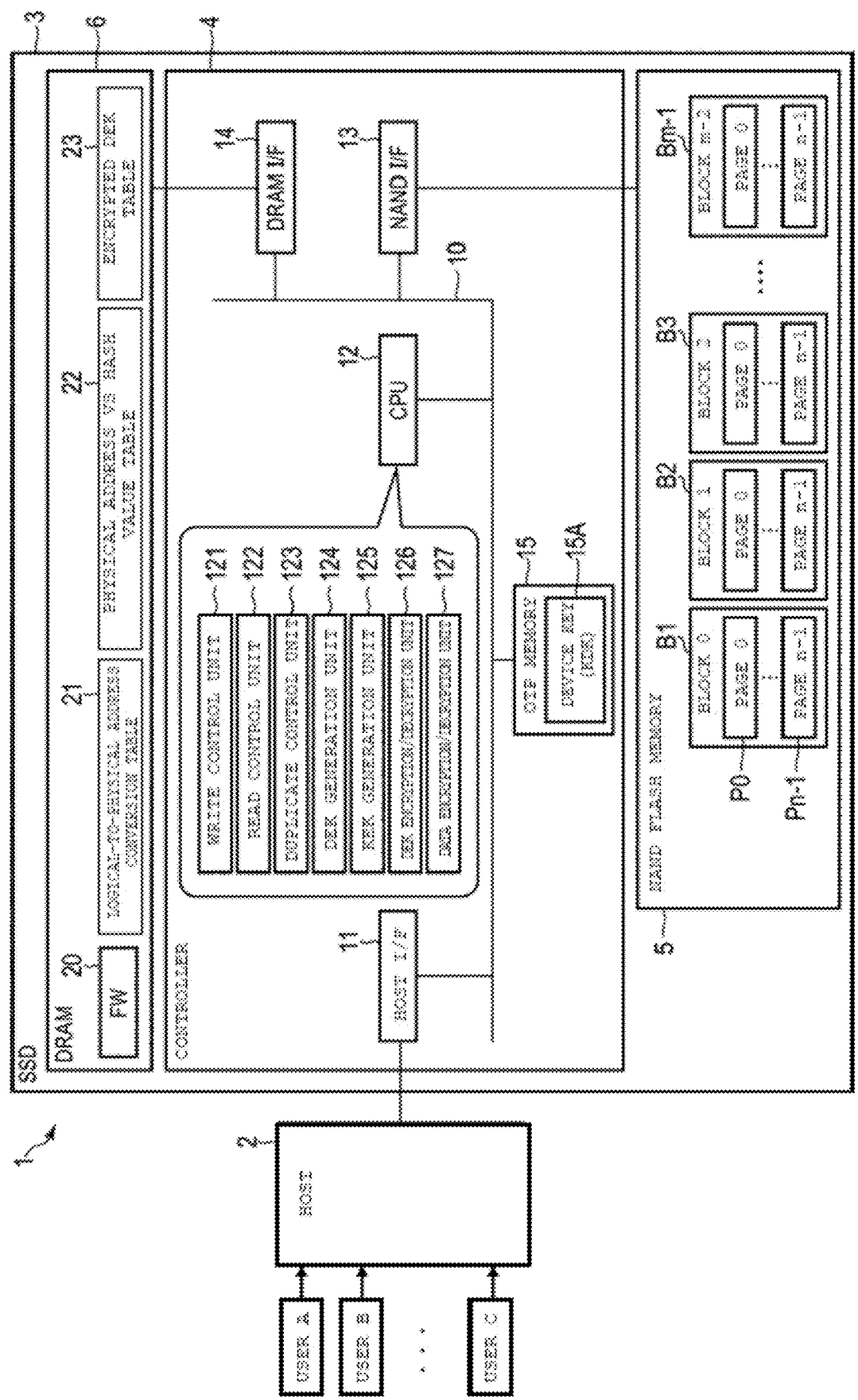
FIG. 15 is a block diagram illustrating a configuration example of an information processing system that includes a memory system according to a second embodiment.

FIG. 15 is a block diagram illustrating a configuration example of an information processing system 1 that includes the SSD 3 of the second embodiment. The SSD 3 of the second embodiment further includes a one-time programmable memory (OTP memory) 15 in addition to the configuration of the SSD 3 of the first embodiment.

The OTP memory 15 includes a plurality of memory elements (that is, memory cells) in each of which data can be written only once. Each memory element of the OTP memory 15 is an irreversible memory element in which data can be written only once. As the OTP memory 15, for example, an electric fuse (e-fuse) is used, but the OTP memory 15 is not limited thereto.

The OTP memory 15 stores a KDK 15A used to generate a DEK. The KDK 15A is a key unique to the SSD 3. That is, a plurality of SSDs use their own unique KDKs. The KDK 15A is stored in the OTP memory 15, and thus it is possible to prevent the KDK 15A from being leaked. Hereinafter, the KDK 15A will also be referred to as a device key 15A.

Figure 16:
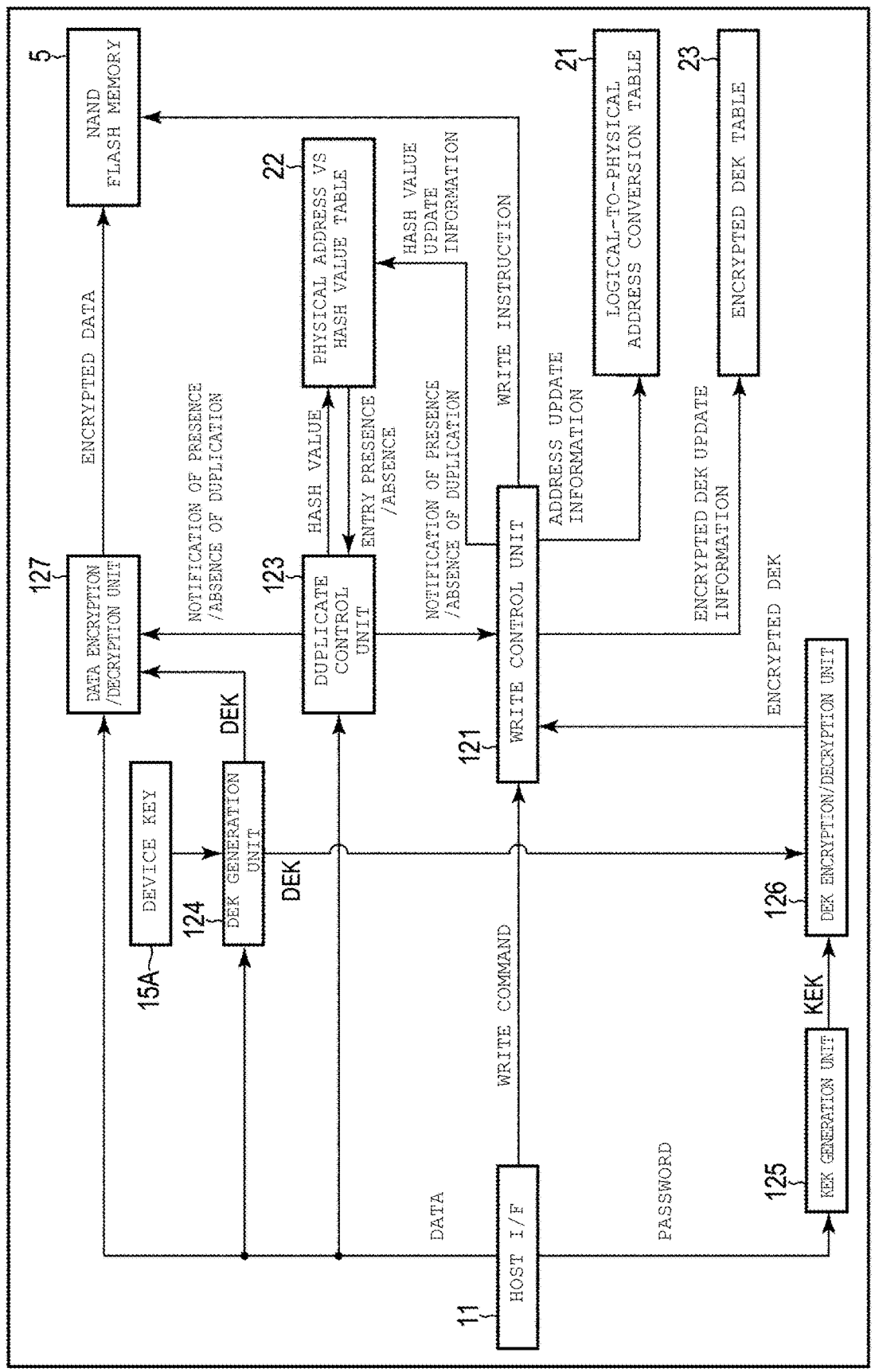
FIG. 16 is a block diagram illustrating an example of a write operation in the memory system of the second embodiment.

FIG. 16 is a block diagram illustrating an example of a write operation in the SSD 3. When the write control unit 121 receives a write command, the DEK generation unit 124 uses the device key 15A and user data received along with the write command, to generate a DEK. Specifically, the DEK generation unit 124 generates the DEK by executing a key derivation function (KDF) with the device key 15A as a KDK and a hash value of the user data as an index. The DEK generation unit 124 sends the generated DEK to the data encryption/decryption unit 127 and the DEK encryption/decryption unit 126.

An operation of each of the other units is the same as that in the first embodiment. A read operation is the same as that in the first embodiment.

With the above configuration, the SSD 3 can increase the strength of encryption of user data using a DEK.

As described above, according to the first and second embodiments, it is possible to improve storage efficiency while maintaining the confidentiality of data for each user. The NAND flash memory 5 stores first encrypted data obtained by encrypting first data with a first DEK. When second data received from the host 2 along with a write request (for example, a write command) is the same as the first data and a first user is using the host 2, the controller 4 encrypts the first DEK with a first KEK associated with the first user to acquire a first encrypted DEK, and stores the first encrypted DEK. When the second data is the same as the first data and a second user different from the first user is using the host 2, the controller 4 encrypts the first DEK with a second KEK associated with the second user to acquire a second encrypted DEK, and stores the second encrypted DEK. When the second data is different from the first data and the first user is using the host 2, the controller 4 uses the second data to generate a second DEK, encrypts the second data with the second DEK to acquire second encrypted data, writes the second encrypted data into the NAND flash memory 5, encrypts the second DEK with the first KEK to acquire a third encrypted DEK, and stores the third encrypted DEK. When the second data is different from the first data and the second user is using the host 2, the controller 4 uses the second data to generate the second DEK, encrypts the second data with the second DEK to acquire the second encrypted data, writes the second encrypted data into the NAND flash memory 5, encrypts the second DEK with a second KEK to acquire a fourth encrypted DEK, and stores the fourth encrypted DEK.

When the first data stored in the NAND flash memory 5 is the same as the second data received along with the write request, the second data encrypted with the first DEK is same as the first encrypted data, and thus the controller 4 is not required to write the second data into the NAND flash memory 5 such that deduplication can be achieved.

When the first data and the second data are the same as each other and the first user is using the host 2, the controller 4 encrypts the first DEK with the first KEK associated with the first user, and stores the encrypted first DEK. In this case, it can be said that the first data (=second data) obtained by decrypting the first encrypted data in the NAND flash memory 5 is kept confidential by the first user associated with the first KEK for decrypting the encrypted first DEK.

When the first data and the second data are the same as each other and the second user different from the first user is using the host 2, the first DEK is encrypted to be stored with the second KEK associated with the second user. In this case, it can be said that the first data (=second data) obtained by decrypting the first encrypted data in the NAND flash memory 5 is kept confidential by the second user associated with the second KEK for decrypting the encrypted first DEK.

As described above, the SSD 3 can improve storage efficiency while maintaining the confidentiality of data for each user.

Each of the various functions described in the first and second embodiments may be implemented by a circuit (processing circuit). Examples of the processing circuit include a programmed processor such as a central processing unit (CPU). The processor executes each of the described functions by executing a computer program (instruction group) stored in a memory. The processor may be a microprocessor including an electric circuit. Examples of the processing circuit also include a digital signal processor (DSP), an application specific integrated circuit (ASIC), a microcontroller, a controller, and other electric circuit components. Each of components other than the CPU described in the embodiments may also be implemented by the processing circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
   a first nonvolatile memory; and
   a controller operatively coupled to the first nonvolatile memory, wherein the controller is configured to:
   in response to determining that second data received based on a first write request from a host is the same as first data and a first user uses the host, the first data being encrypted by using a first data encryption key (DEK) as first encrypted data and stored in the first nonvolatile memory, encrypt the first DEK by using a first key encryption key (KEK) associated with the first user to acquire a first encrypted DEK, store the first encrypted DEK, and skip writing the second data in the first nonvolatile memory;
   in response to determining that the second data is the same as the first data and a second user different from the first user uses the host, encrypt the first DEK by using a second KEK associated with the second user to acquire a second encrypted DEK, store the second encrypted DEK, and skip writing the second data in the first nonvolatile memory;
   in response to determining that the second data is different from the first data and the first user uses the host, use the second data to generate a second DEK, encrypt the second data using the second DEK to acquire second encrypted data, write the second encrypted data into the first nonvolatile memory, encrypt the second DEK using the first KEK to acquire a third encrypted DEK, and store the third encrypted DEK; and
   in response to determining that the second data is different from the first data and the second user uses the host, use the second data to generate the second DEK, encrypt the second data with the second DEK to acquire the second encrypted data, write the second encrypted data into the first nonvolatile memory, encrypt the second DEK using the second KEK to acquire a fourth encrypted DEK, and store the fourth encrypted DEK, wherein
   when the second data is the same as the first data, the first DEK is a hash value of the second data or a hash-based message authentication code (HMAC) value of the second data, and
   when the second data is different from the first data, the first DEK is a hash value of the first data or an HMAC value of the first data, and the second DEK is a hash value of the second data or an HMAC value of the second data.

2. The memory system according to claim 1, wherein the controller is further configured to:
   in response to receiving a read request from the host for reading the second data and determining that the first user uses the host, read the first encrypted data from the first nonvolatile memory, decrypt the first encrypted DEK using the first KEK to acquire the first DEK, and decrypt the read first encrypted data using the first DEK; and
   in response to receiving a read request from the host for reading the second data and determining that the second user uses the host, read the first encrypted data from the first nonvolatile memory, decrypt the second encrypted DEK using the second KEK to acquire the first DEK, and decrypt the read first encrypted data using the first DEK.

3. The memory system according to claim 1, wherein the controller is further configured to:
   in response to receiving a read request from the host for reading the second data and determining that the first user uses the host, read the second encrypted data from the first nonvolatile memory, decrypt the third encrypted DEK using the first KEK to acquire the second DEK, and decrypt the read second encrypted data using the second DEK; and
   in response to receiving a read request from the host for reading the second data and determining that the second user uses the host, read the second encrypted data from the first nonvolatile memory, decrypt the fourth encrypted DEK using the second KEK to acquire the second DEK, and decrypt the read second encrypted data using the second DEK.

4. The memory system according to claim 1, wherein the controller is further configured to:
   generate the first KEK by using a first password associated with the first user; and generate the second KEK by using a second password associated with the second user.

5. The memory system according to claim 1, wherein the controller is further configured to:
   generate the first DEK by using the first data received based on a second write request from the host used by the second user before the second data is received;
   encrypt the first data with the first DEK to acquire the first encrypted data, write the first encrypted data into the first nonvolatile memory;
   encrypt the first DEK using the second KEK to acquire the second encrypted DEK, and store the second encrypted DEK.

6. The memory system according to claim 5, wherein the controller is further configured to:
   in response to receiving a read request from the host for reading the first data and determining that the second user uses the host,
   read the first encrypted data from the first nonvolatile memory, decrypt the second encrypted DEK using the second KEK to acquire the first DEK, and decrypt the read first encrypted data using the first DEK.

7. The memory system according to claim 1, further comprising:
   a second nonvolatile memory, different from the first nonvolatile memory, that stores a key derivation key (KDK), wherein the controller is further configured to:
   in response to determining that the second data is the same as the first data, use the second data and the KDK to generate the first DEK; and
   in response to determining that the second data is different from the first data, use the second data and the KDK to generate the second DEK.

8. The memory system according to claim 1, wherein the controller is further configured to:
   in response to determining that the first user uses the host, use third data to generate a third DEK, encrypt the third data using the third DEK to acquire third encrypted data, write the third encrypted data into the first nonvolatile memory, encrypt the third DEK using the first KEK to acquire a fifth encrypted DEK, and store the fifth encrypted DEK, and
   in response to determining that the second user uses the host, use fourth data to generate a fourth DEK, encrypt the fourth data using the fourth DEK to acquire fourth encrypted data, write the fourth encrypted data into the first nonvolatile memory, encrypt the fourth DEK using the second KEK to acquire a sixth encrypted DEK, and store the sixth encrypted DEK.

\* \* \* \* \*